(12) United States Patent
Kaewert et al.

(10) Patent No.: US 12,062,935 B2
(45) Date of Patent: Aug. 13, 2024

(54) SYSTEMS AND METHODS FOR EXTENDING BATTERY LIFE

(71) Applicant: Stored Energy Systems LLC, Longmont, CO (US)

(72) Inventors: William Kaewert, Longmont, CO (US); Sam Coleman, Longmont, CO (US); Kyle Miller, Longmont, CO (US)

(73) Assignee: Stored Energy Systems, LLC, Longmont, CO (US)

( * ) Notice: Subject to any disclaimer, the term of this patent is extended or adjusted under 35 U.S.C. 154(b) by 0 days.

(21) Appl. No.: 18/344,701

(22) Filed: Jun. 29, 2023

(65) Prior Publication Data

US 2024/0006901 A1    Jan. 4, 2024

Related U.S. Application Data

(60) Provisional application No. 63/357,189, filed on Jun. 30, 2022.

(51) Int. Cl.
*H02J 7/00* (2006.01)
*H01M 10/44* (2006.01)

(52) U.S. Cl.
CPC .......... *H02J 7/0048* (2020.01); *H01M 10/44* (2013.01); *H02J 7/0013* (2013.01); *H02J 7/0042* (2013.01); *H02J 7/00714* (2020.01); *H02J 7/007194* (2020.01)

(58) Field of Classification Search
CPC .............. H02J 7/0048; H02J 7/007194; H02J 7/00714; H02J 7/0013; H02J 7/0042; H01M 10/44

USPC ........................................................ 320/132
See application file for complete search history.

(56) References Cited

U.S. PATENT DOCUMENTS

| | | | |
|---|---|---|---|
| 3,600,661 A * | 8/1971 | Briggs | H02J 7/14 361/18 |
| 3,991,356 A | 2/1976 | Spiteri | |
| 3,976,502 A | 8/1976 | Sekido et al. | |
| 5,140,269 A | 8/1992 | Champlin | |
| 5,184,025 A | 2/1993 | McCurry | |
| 5,250,904 A | 10/1993 | Salander et al. | |
| 5,589,757 A | 12/1996 | Klang | |
| 5,598,084 A | 1/1997 | Keith | |
| 5,744,962 A | 4/1998 | Alber et al. | |
| 5,982,643 A | 11/1999 | Phlipot | |

(Continued)

FOREIGN PATENT DOCUMENTS

WO    2006064125 A1    6/2006

OTHER PUBLICATIONS

Kaewert, William, HELIX Technology Increases Flooded SLI Battery Life and Cuts Risk of Catastrophic Battery Failure in Emergency Generator Applications. 6 pages 2017.

(Continued)

*Primary Examiner* — Nathaniel R Pelton
(74) *Attorney, Agent, or Firm* — FisherBroyles LLP; Craig W. Mueller

(57) ABSTRACT

A system generally comprising a charger with an integrated battery is provided that may be associated with a generator starter. The system is configured to maintain battery charge with the charger that monitors battery temperature before initiating a boost charge. Battery charge is thereafter maintained with the charger supplying a float or eco-float current to the battery, which maximizes system life.

22 Claims, 11 Drawing Sheets

(56) References Cited

U.S. PATENT DOCUMENTS

| | | | |
|---|---|---|---|
| 6,184,649 | B1 | 2/2001 | Phlipot |
| 6,198,860 | B1 | 3/2001 | Johnson et al. |
| 6,417,668 | B1 | 7/2002 | Howard et al. |
| 6,441,584 | B1 | 8/2002 | Crass |
| 6,469,512 | B2 | 10/2002 | Singh et al. |
| 6,847,192 | B2 | 1/2005 | Turner et al. |
| 6,992,487 | B1 | 1/2006 | Steinke |
| 7,573,239 | B2 | 8/2009 | Weston et al. |
| 7,635,983 | B2 | 12/2009 | Pecile |
| 7,821,234 | B2 | 10/2010 | Moriya |
| 9,231,491 | B2 | 1/2016 | Benson |
| 9,350,185 | B2 | 5/2016 | Longdon |
| 9,413,186 | B2 | 8/2016 | Groat et al. |
| 9,466,995 | B2 | 10/2016 | Groat et al. |
| 11,201,361 | B2 | 12/2021 | Clarke et al. |
| 11,745,619 | B2* | 9/2023 | Botts ............... H02J 7/0042 318/139 |
| 2002/0153864 | A1 | 10/2002 | Bertness |
| 2002/0175687 | A1 | 11/2002 | Bertness |
| 2003/0025481 | A1 | 2/2003 | Bertness |
| 2006/0262739 | A1 | 11/2006 | Ramirez et al. |
| 2011/0006737 | A1* | 1/2011 | Saligram ............. H02J 7/04 320/134 |
| 2011/0074357 | A1 | 3/2011 | Parakulam |
| 2011/0084650 | A1 | 4/2011 | Kaiser et al. |
| 2011/0193523 | A1 | 8/2011 | Law |
| 2011/0254582 | A1 | 10/2011 | Partee |
| 2011/0272180 | A1 | 11/2011 | Park et al. |
| 2011/0273181 | A1 | 11/2011 | Park et al. |
| 2012/0166697 | A1 | 6/2012 | Hu et al. |
| 2013/0002190 | A1 | 1/2013 | Ogura |
| 2013/0062966 | A1 | 3/2013 | Verghese |
| 2013/0234675 | A1 | 9/2013 | King |
| 2013/0300347 | A1 | 11/2013 | Xu |
| 2014/0340024 | A1 | 11/2014 | Groat et al. |
| 2015/0123600 | A1 | 5/2015 | Groat |
| 2015/0351037 | A1 | 12/2015 | Brown et al. |
| 2016/0380441 | A1* | 12/2016 | Groat ............... H02J 7/007 320/107 |
| 2019/0036178 | A1 | 1/2019 | Karner et al. |
| 2019/0196575 | A1* | 6/2019 | Grobelny ............. G06F 1/263 |
| 2019/0207267 | A1 | 7/2019 | Vickery et al. |
| 2019/0293723 | A1* | 9/2019 | Pressas ............. G01R 31/389 |
| 2021/0274990 | A1* | 9/2021 | Mitsui ............... A47L 9/2873 |

OTHER PUBLICATIONS

Progressive Dynamics, Inc., PD9105 Charge Wizard. 3 pages. 2013-2014.
Final Invalidity Contentions. *Stored Energy Systems, LLC v. Brunswick Corp.*, Case No. 1:20-cv-06389. 40 Pages. Jun. 23, 2021.
Final Invalidity Contentions Exhibit A-01 Chargetek. *Stored Energy Systems, LLC v. Brunswick Corp.*, Case No. 1:20-cv-06389. 22 Pages. Jun. 23, 2021.
Final Invalidity Contentions Exhibit A-02 DSE9474 & DSE9484. *Stored Energy Systems, LLC v. Brunswick Corp.*, Case No. 1:20-cv-06389. 20 Pages. Jun. 23, 2021.
Final Invalidity Contentions Exhibit A-03 Groat_2015. *Stored Energy Systems, LLC v. Brunswick Corp.*, Case No. 1:20-cv-06389. 25 Pages. Jun. 23, 2021.
Final Invalidity Contentions Exhibit A-04 Groat_2014. *Stored Energy Systems, LLC v. Brunswick Corp.*, Case No. 1:20-cv-06389. 40 Pages. Jun. 23, 2021.
Final Invalidity Contentions Exhibit A-05 Kaewert_2016. *Stored Energy Systems, LLC v. Brunswick Corp.*, Case No. 1:20-cv-06389. 22 Pages. Jun. 23, 2021.
Final Invalidity Contentions Exhibit A-06 Klang_757. *Stored Energy Systems, LLC v. Brunswick Corp.*, Case No. 1:20-cv-06389. 25 Pages. Jun. 23, 2021.
Final Invalidity Contentions Exhibit A-07 Longdon_185. *Stored Energy Systems, LLC v. Brunswick Corp.*, Case No. 1:20-cv-06389. 30 Pages. Jun. 23, 2021.
Final Invalidity Contentions Exhibit A-08 NOCO. *Stored Energy Systems, LLC v. Brunswick Corp.*, Case No. 1:20-cv-06389. 29 Pages. Jun. 23, 2021.
Final Invalidity Contentions Exhibit A-10 PD2100_2012. *Stored Energy Systems, LLC v. Brunswick Corp.*, Case No. 1:20-cv-06389. 35 Pages. Jun. 23, 2021.
Final Invalidity Contentions Exhibit A-11 Phlipot_649. *Stored Energy Systems, LLC v. Brunswick Corp.*, Case No. 1:20-cv-06389. 37 Pages. Jun. 23, 2021.
Final Invalidity Contentions Exhibit A-12 Phoenix Charger. *Stored Energy Systems, LLC v. Brunswick Corp.*, Case No. 1:20-cv-06389. 29 Pages. Jun. 23, 2021.
Final Invalidity Contentions Exhibit A-13 ProNautic. *Stored Energy Systems, LLC v. Brunswick Corp.*, Case No. 1:20-cv-06389. 75 Pages. Jun. 23, 2021.
Final Invalidity Contentions Exhibit A-14 ProSport_Gen3. *Stored Energy Systems, LLC v. Brunswick Corp.*, Case No. 1:20-cv-06389. 8 Pages. Jun. 23, 2021.
Final Invalidity Contentions Exhibit A-15 Spiteri_356. *Stored Energy Systems, LLC v. Brunswick Corp.*, Case No. 1:20-cv-06389. 19 Pages. Jun. 23, 2021.
Final Invalidity Contentions Exhibit A-16 Victron_2011. *Stored Energy Systems, LLC v. Brunswick Corp.*, Case No. 1:20-cv-06389. 24 Pages. Jun. 23, 2021.
Final Invalidity Contentions Exhibit A-17 Alzieu_2006. *Stored Energy Systems, LLC v. Brunswick Corp.*, Case No. 1:20-cv-06389. 40 Pages. Jun. 23, 2021.
Final Invalidity Contentions Exhibit A-18 Bhatt_2005. *Stored Energy Systems, LLC v. Brunswick Corp.*, Case No. 1:20-cv-06389. 63 Pages. Jun. 23, 2021.
Final Invalidity Contentions Exhibit A-19 Horkos. *Stored Energy Systems, LLC v. Brunswick Corp.*, Case No. 1:20-cv-06389. 27 Pages. Jun. 23, 2021.
Final Invalidity Contentions Exhibit A-20 Nguyen. *Stored Energy Systems, LLC v. Brunswick Corp.*, Case No. 1:20-cv-06389. 42 Pages. Jun. 23, 2021.
Final Invalidity Contentions Exhibit A-21 Reid_1987. *Stored Energy Systems, LLC v. Brunswick Corp.*, Case No. 1:20-cv-06389. 31 Pages. Jun. 23, 2021.
Kaewert, William, "Dynamic Boost Battery Charging", 2016.
Power Products, ProMariner ProNautic, 2013. 26 pages.
Vader. Energy Unlimited. Electricity on Board. Rev. 9. 2011. 73 pages.
Progressive Dynamics, Inc., "PD2100 Product Page", 2012. 2 pages.
Progressive Dynamics, Inc., Progressive Dynamics Marine Converters/Chargers (including PD2100 Series and PD9100 Series + Charge Wizard), 2012. 3 Pages.
NOCO, NOCO Chargers, 2010. 6 pages.
Chargetek, Battery Charger Basics, 2014. 3 pages.
Vader. Victron Energy, "Electricity on Board", 2007. 2 pages.
Victron Energy, "Phoenix Charger User Manual", 2002. 16 pages.
Victron Energy, Victron Phoenix Charger, 2010. 2 pages.
Deep Sea Electronics, Inc., Deep Sea DSE9400 Series Charger, 2010. 32 pages.
Blue Sea Systems, Inc., "P12 Battery Charger User Manual", Jul. 12, 2016. 1 page.
Blue Sea Systems, Inc., Blue Sea P12 Battery Charger, 2013.
Final Invalidity Contentions Exhibit A-09 P12_Manual_2016. *Stored Energy Systems, LLC v. Brunswick Corp.*, Case No. 1:20-cv-06389. 35 Pages. Jun. 23, 2021.
Bhatt, et al., A New Approach to Intermittent Charging of Valve Regulated Lead-Acid Batteries in Standby Applications. 2005. 6 pages.
Horkos, et al., Review on Different Charging Techniques of Lead-Acid Batteries. 2015.
Progressive Dynamics. Battery Management 101. 10 pages. 2021.
Defendant's LPR 3.2(A) Final Non-infringement Contentions. *Stored Energy Systems, LLC v. Brunswick Corp.*, Case No. 1:20-cv-06389. 39 Pages. Jul. 21, 2021.
Energy Unlimited by Reinout Vader. 2004. 72 pages.

(56) References Cited

OTHER PUBLICATIONS

Complaint in *Stored Energy Systems, LLC* v. *Brunswick Corp. and Power Products LLC*, Case No. 1-20-cv-06389 (N. D. Ill.). 14 pages.
J.J. Lander, Further Studies on the Anodic Corrosion of Lead in H2SO4 Solutions, Electrochemistry Branch, Chemistry Division. Naval Research Laboratory Report (1955). 37 pages.
R.F. Nelson, E.D. Sexton, J.B. Olson, M. Keyser, A. Pesaran, Search for an optimized cyclic charging algorithm for valve-regulated lead-acid batteries, J. Power Sources, 88, 44-52, (2000). 9 pages.
Blue Power by Victron Energy. 3 pages.
Professional Mariner, LLC, ProMariner ProNauticP Chargers Win 2010IBEX Innovation Award, Professional Mariner LLC. https://www.promariner.com/en/news/2010innovationawardibex. 2010. 3 pages.
Defendants' Disclosure of Unenforceability and Invalidity Gounds. *Stored Energy Systems, LLC* v. *Brunswick Corp.*, Case No. 1:20-cv-06389. 6 Pages. Jun. 23, 2021.
T. M. Phuong Nguyen, Guillaume Dillenseger, Christian Glaize, and Jean Alzieu (2010). Traditional Float Charges: are They Suited to Stationary Antimony-free Lead Acid Batteries?, Trends in Telecommunications Technologies, Christos J Bouras (Ed.), ISBN: 978-953-307-072-8, InTech, Available from: http://www.intechopen.com/books/trends-in-telecommunications-technologies/traditional-float-charges-are-they-suited-to-stationary-antimony-free-lead-acid-batteries-.29 pages. Mar. 1, 2010.
Marinco—Charge Pro Battery Chargers, www.marinco.com, Milwaukee, WI, copyright 2014, 4 pp.
Computronic Controls—Sentinel 150/UL150, Automatic Switch Mode Battery Chargers, www.computroniccontrols.com, Birmingham, United Kingdom, Feb. 8, 2012, 4 pp.
Computronic Controls—Sentinel 300P, Programmable Switch Mode Battery Chargers, www.computroniccontrols.com, 3irmingham, United Kingdome, Oct. 16, 2014, 4 pp.
Computronic Controls—Sentinel 150P, Automatic Switch Mode Battery Chargers, www.computroniccontrols.com, Birmingham, United Kingdom, Jul. 11, Jul. 11, 2014, 4 pp.
JSEPower—DES9470, DSE9472, DSE9480 & DSE9481—MKII Intelligent Battery Chargers, www.deepseausa.com, Jeep Sea Electronics Inc., Rockford, Illinois, 2 pp. (no date).
JESPower—DSE9474—Intelligent Battery Charger, www.deepseausa.com, Deep Sea Electronics Inc., Rockford, Illinois, 2 pp_ (no date).
LaMarche Stationary Battery Informer, www.lamarchemfg.com, La Marche Mfg., Des Plaines, Illinois, 2 pp. (no date).
International Search Report and Written Opinion from related PCT/US23/69427. Dated Nov. 27, 2023. 16 Pages.

\* cited by examiner

SYSTEMS AND METHODS FOR EXTENDING BATTERY LIFE

This application claims the benefit of U.S. Provisional Patent Application Ser. No. 63/357,189, filed Jun. 30, 2022, the entirety of which is incorporated by reference herein.

This application is also related to U.S. Pat. Nos. 9,270,140, 9,413,186, and reexamined U.S. Pat. No. 9,948,125 C1, the entireties of which is incorporated by reference herein.

FIELD OF THE INVENTION

Embodiments of the present invention are generally directed to self-contained automatic battery charging systems that maximize the life of connected, maintenance-free batteries by selectively varying charger output voltage cycles as a function of battery temperature and/or input current. Embodiments of the present invention described herein also improve the overall reliability of the generator starting systems used in critical power applications.

BACKGROUND OF THE INVENTION

Starting batteries remain the number one cause of emergency generator (genset) failure. Indeed, over 80% of all starting failures are due to dead batteries. When they do fail, generator batteries frequently fail suddenly, seemingly without warning. Because of foreseen battery failure, regulatory mandates sometimes dictate that batteries used to start emergency generators, diesel fire pumps, etc., must be continuously charged, ensuring the batteries are ready for service at all times. Accordingly, a battery charger is used to deliver electrical energy in a predetermined fashion to interconnected batteries. Battery chargers are also typically tasked with providing direct current to power accessories such as electrical switchgear and/or the supervisory systems necessary for interconnected generator or fire pump systems to function.

Those of ordinary skill in the art will appreciate that batteries in personal and work vehicles are generally reliable; thus, the rate of failure-to-crank in modern vehicles is extremely low. And indication of impending failure is frequently available in the form of observable deterioration of engine crank performance before vehicles no longer start. Unfortunately, genset starting is rarely observed by people, meaning that degradation of performance must be addressed either by replacement or by technical means. Users typically replace genset SLI batteries every two to three years, which is frustrating because the same SLI batteries used in vehicles typically will last nearly twice as long. Even though the batteries perform the identical job of delivering high-rates of current to crank internal combustion engines, the "use model" of batteries employed in gensets differs in one key respect from those employed in vehicles. Batteries used on gensets are charged around the clock, whereas vehicle batteries are charged intermittently.

More specifically, batteries are often optimized for their most common applications, which generally involve delivering high current to start generators, cars, trucks, off-road vehicles, and other mobile and/or heavy equipment. In these common applications, the batteries are only charged when the machine's engine runs with an alternator, which functions for a few hours each day when the vehicle/machine is operating. In these circumstances, the materials composing the batteries tend to fail gradually at the same rate, and nearly all battery components tend to fail around the same time. Although this is the charging scheme for which batteries are designed, the intermittent alternator charging approach is ineffective in emergency generator or diesel fire pump applications wherein mandates dictate continuous charging (i.e., round-the-clock battery charging) that exceeds the short daily charging time anticipated by battery designers. Accordingly, Gensets must employ a battery charging strategy different from vehicle charging schemes. A static battery charger is commonly provided that continuously "float" charges the battery to ensure that the battery is fully charged at all times and to perhaps power accessory equipment. Some batteries, however, are not designed to be continuously float-charged and suffer premature failure when they are.

In some applications, a battery charger alternately outputs two charging voltages to the interconnected battery: a "float" voltage and a "boost" fast-recharge voltage. The float voltage is output approximately 99% of the time and is intended to maintain the battery in its fully charged state by replenishing charge at the same rate the battery self-discharges (e.g., up to approximately 13.3 to 13.8 volts for a 12-volt battery). The boost voltage is applied intermittently and intended to quickly charge a zero-volt battery that has never been charged or recharge an existing battery that has undergone a discharge event (e.g., approximately 15.5 volts for a 12-volt battery). The boost charge is employed only for the limited duration necessary to fully charge the battery, after which the output voltage from the charger returns to the float voltage pending the next discharge event.

Those of ordinary skill in the art will appreciate that continuous float charging considerably shortens the life of the separator materials commonly used in flooded lead-acid batteries. More specifically, "separators" separate the positive and negative electrodes of a battery's galvanic cell. The separator must function over a long time to physically separate the electrodes without excessive hindrance to ionic current flows. In the hostile environment of a lead-acid battery, which exposes the separator to sulfuric acid and strong oxidizing species such as lead dioxide or nascent oxygen, only a few substances are stable over the battery's expected life. These substances primarily include silica, glass fibers, a few salts, and a few synthetics. Polyethylene is generally the selected material in most flooded lead-acid batteries. All organic separator materials, including polyethylene, will decompose and, via several intermediate steps, oxidize to carbon dioxide and water over time, leading to separator failure. Separator failure is sometimes catastrophic because failed separators enable short circuits between the positive and negative electrodes. A large short-circuit current flowing between electrodes may lead to battery explosion.

Similarly, well-known NiZn batteries with a positive electrode made of nickel oxide and a negative electrode made of zinc also employ a separator (see, e.g., U.S. Pat. No. 3,976,502). NiZn batteries are desirable because they are smaller and lighter than other rechargeable batteries. Further, NiZn batteries have a high power density and work well at a partial state of charge, much better than lead acid batteries that often must be oversized to meet potential power needs. Like SLI batteries, NiZn battery service life can be shortened by overcharging, float charging, etc., but the failure mode is typically not associated with separator degradation. In shallow discharge starting applications one failure mode of NiZn batteries of concern is "electrode dry out," i.e., electrolyte loss, which presents as a gradual, non-catastrophic failure. One of ordinary skill in the art will appreciate that battery performance is maximized when contained electrolyte is maintained at factory original levels.

However, normal battery charging increases battery temperature, which can liberate hydrogen and oxygen from the aqueous electrolyte. Excessive charging voltage can, in some cases, liberate sufficient gas to cause pressure release valves in the battery to vent. More modest gas pressure can allow gas molecules (primarily tiny and lightweight hydrogen) to migrate through the plastic battery housing, thereby reducing electrolyte volume in the battery. Most NiZn batteries do not provide a way to replenish fluid loss associated with overcharging and normal battery use. In practice, a plurality of NiZn batteries are connected in series/parallel combinations. More specifically, Various DC bus voltages are used for generator starting systems, wherein 12 Vdc and 24 Vdc are the most common (with 48 Vdc systems also possible). To obtain the required voltages, batteries are connected in series such that each battery adds to the previous battery voltage to create a "string." The load on the batteries will vary with each application. To support larger loads, battery strings are connected in parallel for increased capacity. The resulting system comprises a series/parallel combination of batteries. In most battery systems, the battery charger(s) and loads are then connected across the total series/parallel battery combination.

In theory, all of the battery strings perform equally, having the same number and type of batteries, which means that the total battery voltage should divide equally across each battery, and each battery should charge and discharge equally. However, in practice, battery resistance can vary from one battery to the next due to manufacturing variations and deterioration. The impedance variance can result in unequal voltages across each battery during charging and discharging events. Furthermore, battery voltage and the battery's ability to accept charge current depend on the state of charge and the health of each battery. When the state of charge and the health of the batteries differ in a string, the voltage across each battery can become unequal. Those of ordinary skill in the art will appreciate, when individual battery voltages in a battery string become unequal, or the total battery impedance of one string differs from the other strings, batteries become over or undercharged, and batteries deliver unequal amounts of current to the load during discharge. Left unchecked, this typically results in permanent battery damage and shortened battery life. Continued operation under these conditions further accelerates battery life degradation.

Those of ordinary skill in the art will appreciate that it is beneficial to improve the overall reliability of the generator starting systems used in critical power applications because battery failures are the number one cause of generator start failure. It follows that identifying the occurrence of a potential failure mode with the starting batteries before such problem deteriorates to a point where it cannot be compensated and the generator will not start.

Thus, there exists a need for battery-life-extension charging systems and methods that fulfill the regulatory requirements mandating continuous charging of batteries employed in emergency generator and/or diesel fire pump applications and that reduce the rate at which battery components degrade, thereby extending battery life and reducing the frequency of premature and catastrophic battery failures. Embodiments of the present battery-life-extension charging systems and methods mitigate the life-reducing effect on batteries caused by continuous "float" battery charging and also provide the ability to continuously maintain the battery in a near fully charged state to provide auxiliary power when needed. As explained below, the systems and methods disclosed herein also reduce the overall amount of continuous current the battery charger sends to the battery, thus reducing the long-term electrical power consumption of the battery charger and, as a result, reducing operating expenses.

SUMMARY OF THE INVENTION

It is one aspect of some embodiments of the present invention to provide a system comprising a battery charger with at least one integrated battery. For example, the contemplated system can be used for the emergency starting of a genset when AC power is lost. The contemplated system can also be adapted to supply industrial rescue power, marine applications, etc. The system of some embodiments of the present invention are small (e.g., about 1.7 $ft^2$ footprint), light (e.g., weighing about 90 lbs.), more powerful than systems currently in use, and can be communicated with remotely. The system of 8D-sized one embodiment provides an equivalent engine starting capacity as four 8D lead-acid batteries. The battery charging system may generally comprise an enclosure configured to contain and protect the battery, charger, and associated electrical components from the environment. In some embodiments, the closure mimics the physical dimension of an 8D battery and other standard size battery housings to facilitate the replacement of standard lead-acid batteries. The system of one embodiment can supply 12V or 24V power using NiZn batteries, but other versions, such as 48V output, are envisioned that would not depart from the scope of the invention. NiZn batteries are preferable as they offer performance and other benefits that exceed that provided by any other battery technology. For example, NiZn batteries offer higher-rate discharges than lithium or lead-based batteries and are more environmentally responsible—e.g. require fewer resources and less energy to manufacture and recycle than lead-acid or lithium type batteries.

As alluded to above, it is another aspect of some embodiments of the present invention to provide a battery charging system configured to interconnect with another battery charging system (or systems) or a plurality of batteries to address the needs of larger genset starting systems, e.g., 24V starting systems. In one embodiment, multiple battery charging systems are interconnected in parallel, thereby forming a series/parallel battery bank associated with multiple chargers. These embodiments of the present invention employ sensors and charging algorithms that ensure none of the connected batteries is overcharged at high temperatures, wherein each charger coordinates its temperature-adjusted charge voltage based on the maximum battery temperature measured of any installed charger and not on an average or the temperature of a master connected charger. In this embodiment, all charger operation is synchronized with a master/slave setup that employs charger mode synchronization for all modes of operation, wherein average battery temperature or the temperature of the highest voltage battery is used to dictate mode initiation or modification. Further, any difference in temperature between any of the connected batteries is monitored. If the temperature difference exceeds a defined threshold, none of the batteries will be charged as charger current will travel to the hottest battery with the lowest impedance and further imbalance battery voltage and state of charge. More specifically, those of skill in the art will appreciate that, counter other battery types, The internal resistance of NiZn batteries tends to drop, rather than increase, as the battery state of health deteriorates, meaning that a weaker NiZn battery will tend to supply relatively more current to the connected load than parallel-connected batteries. Because it supplies more current than other batteries, the weaker battery gets warmer than the others, further accelerating the deterioration of the weaker battery's health. It is thus important to minimize variations in temperature, voltage, and state of charge between batteries so that all batteries in the system remain near the same state of health throughout the battery system's life.

In one embodiment, sensors that monitor voltage, temperature, and/or impedance (i.e., some indication of battery health) are connected across the terminals of each NiZn battery of a battery bank. As batteries age, their health deteriorates, and battery impedance changes. By monitoring each battery's admittance, weak batteries, which could result in the inability of the system to deliver adequate current to support the expected load, can be identified, removed, and replaced. The sensors communicate with an integrated or remote control system configured to direct the battery chargers and/or sensors to balance the voltage between batteries.

The control system of one embodiment is configured to direct at least one battery charger to apply a resistive load to the battery or batteries interconnected thereto based on sensed battery voltage, current, etc. Battery and/or charger life can be maximized based on the sensed measurements. The monitoring protocol also allows for the identification of starting system failures so they can be addressed well-before genset start is required. The contemplated control system of one embodiment monitors the voltage across each battery and identifies voltage imbalances. If an issue is identified, an integrated load resistor of the battery sensor is used to individually and selectively adjust battery voltage by applying load to each battery or string in the system. Over time, selective loading will partially discharge individual batteries or battery strings to equalize the voltage of each battery, which results in longer battery life than a system without active voltage balancing.

The battery charger of one embodiment of the present invention is connected to the battery or batteries in an integrated fashion, i.e., the point of interconnection into the battery or battery bank is fixed. One of ordinary skill in the art will also appreciate that this interconnection scheme may be used to integrate charger sensors (e.g., a calibrated temperature sensing probe) into the battery or batteries. By monitoring the temperature of each battery, or series of interconnected batteries, temperature-compensated charging voltage can be adjusted to the highest battery temperature in the series/parallel battery bank to prevent overcharging at high temperatures. This measure also maximizes battery life. Further, monitoring the terminal temperature of each battery also allows the system to identify problems in the battery connections, which could result in the inability of the system to deliver adequate current to support the expected load.

In contrast, discrete (i.e., independently mounted, not in a common enclosure) charger/battery units often require a remote temperature sensing scheme so to enable the charger to detect accurate battery temperature. Ample field history has demonstrated that remote temperature schemes are inconvenient to install, typically meaning that the remote temperature sending requirement is ignored, which ultimately results in shortened battery life.

Further, the transfer cable interconnected to the battery or batteries may be closely monitored to ensure the intended amount of voltage or energy transferred to the battery or batteries is correct, i.e., internal cable losses are accounted for. In some embodiments, the charger-to-battery interface may be selectively shunted to prevent current from traveling to the battery or batteries. For example, current to the battery or batteries may be monitored, wherein outside active charging periods, the amount of current delivered to the battery or batteries is minimized or prevented.

The system can be interconnected in parallel with other like systems or different charging systems. Further, the system of one embodiment of the present invention can be connected to a Best Battery Selector (BBS) system adapted to deliver power from two different batteries to a load environment requiring very high availability. If one battery is weak or has failed, power will automatically flow to the load from the other battery, thereby ensuring power will be available if needed. The battery selector prevents parallel connection of two batteries so that a weak or dead battery will not cause the failure of the other. An example of a BBS is the BBS-800, BBS-1600, and BBS-4800 devices developed by the applicant.

It is another aspect of some embodiments of the present invention to provide a battery charging system that employs a charge algorithm that addresses the problems of short genset battery life and sudden battery failures described above. The contemplated algorithm emulates the charging regime for which some batteries were originally designed but continues charger operation to support continuous DC loads. In the system of one embodiment, the charger will not charge a battery if its temperature is between about 30 to 50° C. (between about 85-125° F.) (in another embodiment, the battery temperature must be under 40° C. (140° F.)) and, when charging, provides a partial state of charge with supplied voltage below the battery's maximum voltage. The contemplated charger can also provide a "boost" charge if needed, which will be discussed below. This approach reduces battery charging voltage to just above battery open-circuit voltage for most of the time the battery would have been on continuous float charge. This in turn minimizes current flowing into or out of the battery during maintenance charging, which prolongs battery life by minimizing the amount of electrolyte lost due to electrolysis and loss of primarily hydrogen molecules through the battery's plastic case. The charger remains active and available to power DC loads, preventing them from discharging the battery. The charger periodically increases battery voltage to ensure it remains at or near full capacity and capable of performing its duties. This arrangement thus emulates the on/off type of charging historically used with NiZn batteries. Further, this algorithm reduces the current going into the battery and prevents overcharge. Reducing the time the battery is actively charged also significantly reduces the amount of electrolyte lost due to electrolysis. This improvement reduces the frequency of premature and catastrophic battery failures of genset batteries.

The charging algorithm of another embodiment is configured to address a discharged battery by initially entering a boost charge cycle that delivers a constant current to at least one interconnected battery. In one embodiment, 12 A DC is delivered when connected to a 120 Vac mains, and 15 A is delivered when connected to 208/240 Vac mains. During the boost phase, the charger's target boost voltage is set to 15.2V/30.4V, nominal at 25° C., and the charge is maintained in a constant current mode until the target boost voltage is reached at the battery terminals. Depending on the time it takes to reach the target boost voltage, the charge is held at the target boost voltage for between about 45 to 60 minutes. For example, if it took less than 1.5 hours to reach the target boost voltage, the boost hold time will be about 45 minutes, and about 60 minutes if it took more than 2 hours. The algorithm may also provide a periodic boost that is initiated at predetermined time intervals, e.g., every 30 days, for a predetermined time, e.g., 60 minutes. In one embodiment, the periodic boost voltage is 15.2V/30.4V nominal at 25° C.

The algorithm may be battery temperature dependent, wherein all charge voltages are temperature-compensated based on the values provided by the charging system. In one embodiment, charging only occurs when battery temperature is maintained between about 0° C. and 50° C. In this example, the charger will not enter a boost charge mode (automatic or periodic) if measured battery temperature is above 50° C. In embodiments where a plurality of batteries are interconnected to a charger, a temperature probe is interconnected to the positive terminal of the highest voltage battery in a string. Charger voltage is adjusted to set the target voltage as measured at the battery terminals, not the charger terminals, which ensures that charge is delivered only if a battery is in the correct temperature range. This aspect, thus, accounts for any charger(s) and battery(ies) temperature variation.

In operation, battery temperature is checked at the beginning of the boost cycle to set the charging voltage. Thereafter, battery temperature is checked periodically, e.g., every hour, and will only be adjusted if the temperature decreases, ensuring complete charge and avoiding exiting the boost mode too early. If the periodically measured battery temperature increases above 40° C. by a predetermined amount, e.g., 43° C., boost charge target voltage will be decreased or charging will be discontinued until the measured battery temperature is lowered, e.g., to 38° C., to prevent overcharging and shortened battery life. Those of skill in the art will appreciate that some embodiments of the present invention are configured to measure battery temperature and adjust boost voltage continuously.

The algorithm of another embodiment of the present invention is similar to that disclosed in the '125 Patent but adds a temperature monitoring component, which may be similar to that described above, to further ensure the battery lifespan is maximized. In operation, after a temperature-dependent boost charge cycle is initiated and completed, charger voltage is set above the "open circuit voltage" of the battery (i.e.) but below the continuous battery's charge point. The supplied voltage maintains the battery at a partial charge state, maintains the charge/discharge current near zero, and allows the charger to support external loads. The contemplated charger of one embodiment does not maintain the interconnected battery or battery bank at 100% charge, which increases battery and system life. The algorithm is primarily envisioned for co-located, "same box" charger/battery systems. However, one of ordinary skill in the art will appreciate that the concepts described herein can be used when the charger is separated from the batteries.

The basic algorithm employed by some embodiments of the present invention directs the battery charging system to enter a boost charge cycle to address a discharged battery. The boost mode delivers a constant current to the battery or batteries. The charging system of one embodiment can deliver 12 A when connected to 120V AC and 15 A when connected to 208/240V AC. The algorithm sets a target boost voltage of 15.2V/30.4V (nominal at 25° C.). Battery temperature is checked and charging voltage is set at the beginning of the boost charge cycle. Temperature is checked only every hour thereafter, and the charge voltage is adjusted if the temperature decreases.

During the constant current boost mode, charging proceeds until the target boost voltage is reached at the battery terminals. The algorithm prevents boost charge initiation (auto or periodic) if the measured battery temperature is above 50° C. or below 0° C. The boost charge mode will also be discontinued when the measured battery charge increases over a predetermined level. For example, in one embodiment, if the measured temperature increases above 40° C. during boost charge, e.g., an increase to 43° C., the target charge voltage is lowered to the battery check voltage (e.g., 13.2V/26.4V), which is maintained until the measured battery temperature falls below 38° C., allowing the boost charge cycle to be restarted. In another embodiment, if the measured temperature increases above 50° C. during boost charge, e.g., an increase to 53° C., the target charge voltage is lowered to the battery check voltage (e.g., 13.2V/26.4V), which is maintained until the measured battery temperature falls below 48° C., allowing the boost charge cycle to be restarted. The algorithm maintains the boost voltage for a minimum of about 45 minutes and a maximum of about 60 minutes after the target boost voltage is reached. For example, if it takes less than about 1.5 hours to reach the target boost voltage, the boost hold time will be about 45 minutes. If it takes more than about 2 hours to reach the target boost voltage, the boost hold time will be about 60 minutes. Upon reaching the end of the 45 to 60-minute boost hold, the algorithm shifts the charging system to the float mode.

In float mode, the charging system maintains a consistent target voltage of 14.2V/28.4V (nominal at 25° C.). Also, similar to boost mode operations, battery temperature is checked only once per hour, and the charge voltage is likewise adjusted. The charging system does not completely turn off during float mode as generator sets have continuous control loads like engine controllers (typically <2 A is required). The goal is to have the charger, not the battery, support the load. Float mode is maintained until a battery discharge event or a timed periodic boost is triggered. The boost cycle restarts if the battery draws over 80% of the charging system's rated power (which may happen when the battery has been discharged and needs charging). As alluded to, some algorithms provide a periodic boost initiated every 30 days, wherein the charging system initiates the boost mode for 60 minutes at 15.2V/30.4V (nominal at 25° C.).

Charger system operation of one embodiment is synchronized with a master/slave setup that includes charger mode synchronization (boost, float, periodic boost, etc.) and charger voltage. A master charging system commands all of the connected slave charging systems to the desired voltage setting, and slave charging systems may then adjust their set voltage +/−0.2V from the commanded voltage setting provided by the master charging system to balance current between all of the connected chargers. If current is not balanced within the allowed voltage adjust range, the voltage will remain at the maximum adjustment point and the master charging system will generate a load share fault alarm. When in parallel operation, temperature compensation is active, and the master charging system will use the average or maximum temperature of all connected chargers to calculate the target charge voltage. In operation, a temperature probe is located on the positive terminal of the highest voltage battery. The charging system of one embodiment has cable compensation between the charger and battery cables. Charging system voltage is adjusted to ensure that the set target voltage is as measured at battery terminals and not the voltage at the charging system terminals.

NiZn battery life can be adversely affected by temperature. Accordingly, to properly charge NiZn batteries and preserve system (charger/battery) service life, exact temperature-compensated charge voltages should be used, and frequent changes to the charger's output voltage in all charge states should be avoided. Thus, some embodiments of the present invention have added one or more of the following features to a traditional charge algorithm and the algorithm discussed in the '125 Patent:

1) Battery temperature is checked at the beginning of a boost cycle, and a predetermined charging voltage is set.
2) Battery temperature is then checked at predetermined intervals (e.g., every hour). Thereafter, charge voltage is adjusted only if the battery temperature has decreased, which avoids battery over-charge and premature boost exit.
3) Battery temperature rise during boost doesn't affect charging voltage, which ensures the charge cycle isn't affected by battery self-heating during the charge.
4) During float charging, battery temperature is checked at predetermined time intervals (e.g., every hour), and charge voltage is adjusted in a stepped manner instead of being continuously adjusted, which maintains the circulating current near 0 amps.
5) The charger exits boost at high and low temperatures, i.e., stops charging to maximize battery life.
6) A low ripple charge is provided that maintains near zero battery current when in float mode to support external loads.
7) The charger provides a refresh charge, which is substantially the same as boost cycle voltage, at predetermined intervals if needed. In some embodiments, the NiZn batteries only require a refresh charge every 30 days, as opposed to a charge refresh every 12 hours, and in lead acid battery applications.

It is one aspect of some embodiments of the present invention to provide a system wherein battery charger output is managed to control an interconnected NiZn battery's state of charge (SOC). In one embodiment, the battery's SOC is maintained at a level that is "well charged" but to a value less than 100% of the battery's maximum charge, which materially reduces the risk of electrolyte dry out. One way to achieve the goal of prompt recharging while managing battery temperature and delivered current (thereby preventing or minimizing the occurrence of overcharging) is to control the charging algorithm such that multi-stepped voltage changes are provided to the battery during the float mode, i.e., providing a modified float mode.

One of ordinary skilled in the art will appreciate that the inventions described in the patent mentioned above may be incorporated into the concepts described herein without departing from the scope of the present invention.

Some embodiments of the present invention provide additional battery-life-extension features. The contemplated charging system may include (1) a monitoring component configured to measure a direct current (DC) output current delivered by the charging system to a battery, wherein the DC output current is a function of existing charge status of the battery; (2) a timing component; and (3) a charge control system in communication with the monitoring component and the timing component. The charge control system may be configured for (a) obtaining at least one of a time measurement from the timing component and a charge measurement from the monitoring component; (b) based on the at least one of the time measurement and the charge measurement, determining at least one of a time to complete a charge mode cycle and a charge to complete a charge mode cycle, each tailored to achieve a desired charge status of the battery; and (c) based on the at least one of the time and the charge to complete the charge mode cycle, transitioning to a select one of several DC output voltage settings until the time to complete the charge mode cycle has passed or the charge to complete the charge mode cycle has been provided, wherein the DC output voltage settings include at least an eco-float output voltage setting, a refresh output voltage setting, and a boost output voltage setting.

Other embodiments employ a battery-life-extension charging method that may include (1) obtaining a charge measurement associated with a battery via a monitoring component of a battery charger, the charge measurement reflecting a direct current DC output current delivered by the battery charger to the battery; (2) obtaining a time measurement associated with the battery via a timing component of the battery charger; (3) transmitting at least one of the charge measurement and the time measurement to a battery charge control system of the battery charger; (4) determining, by the battery charge control system and based on the at least one of the charge measurement and the time measurement, at least one of a charge to complete a charge mode cycle and a time to complete the charge mode cycle, the charge mode cycle tailored to achieve a desired charge status of the battery; and (5) selectively regulating, by a voltage regulator in communication with the battery charge control system, a DC output voltage of the battery charger to one of a number of pre-set DC output voltages until the time to complete the charge mode cycle has passed or the charge to complete the charge mode cycle has been provided, the pre-set DC output voltages comprising an eco-float output voltage, a refresh output voltage, and a boost output voltage.

The Summary of the Invention is neither intended nor should it be construed as being representative of the full extent and scope of the present invention. That is, these and other aspects and advantages will be apparent from the disclosure of the invention(s) described herein. Further, the above-described embodiments, aspects, objectives, and configurations are neither complete nor exhaustive. As will be appreciated, other embodiments of the invention are possible using, alone or in combination, one or more of the features set forth above or described below. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present invention are possible utilizing, alone or in combination, as set forth above and/or described in the accompanying figures and/or in the description herein below.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and drawing figures are to be understood as being approximations which may be modified in all instances as required for a particular application of the novel assembly and method described herein.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description and in the appended drawing figures.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

Figure 1:
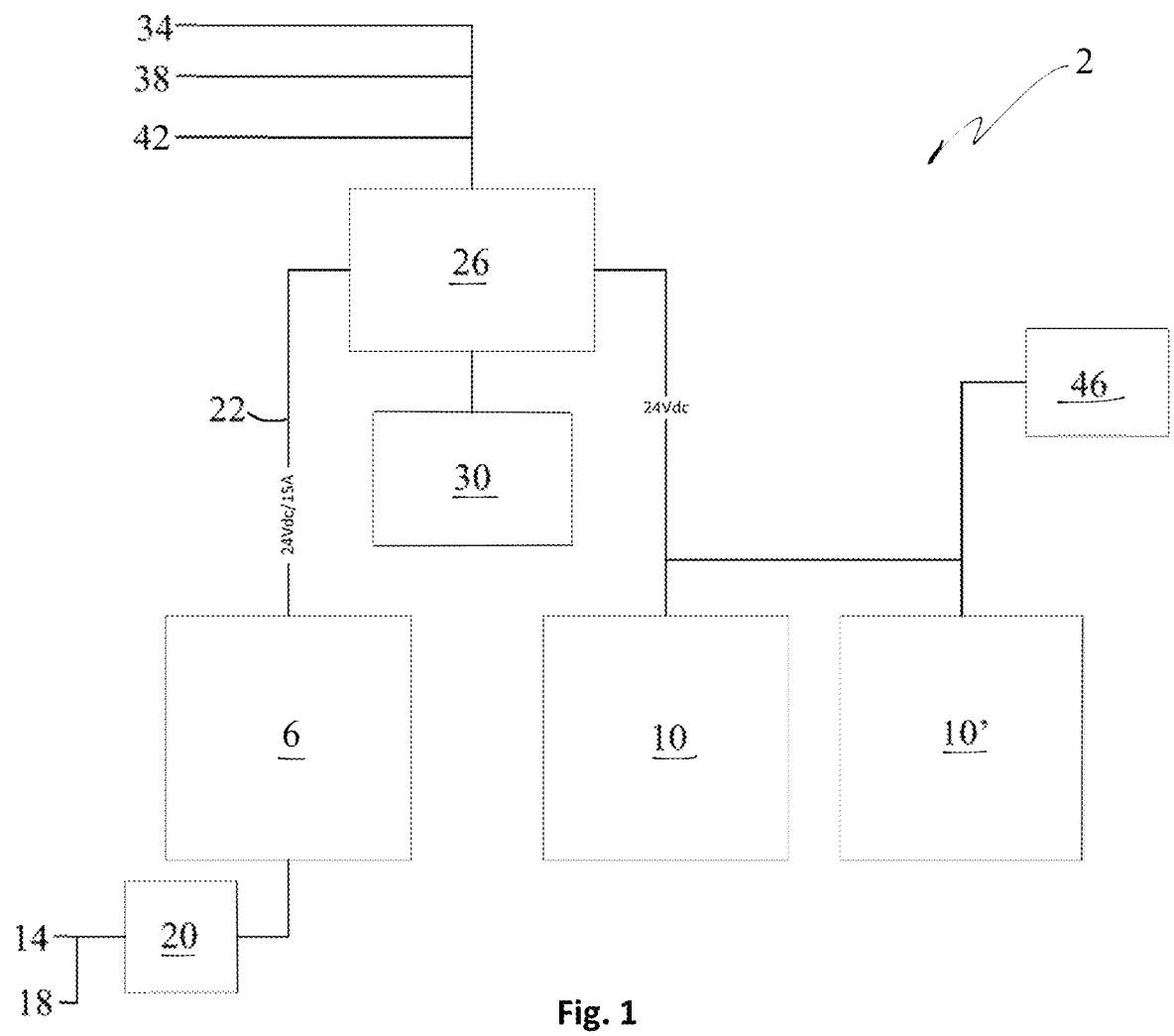
FIG. 1 is a schematic representation of the integrated starting system of one embodiment of the present invention.

The following component list and associated numbering found in the drawings is provided to assist in the understanding of one embodiment of the present invention:

Component

2 Starting system
6 Battery charger
10 Battery
14 AC power input
18 AC power output
20 AC connector
22 Charger output
26 Circuit board
30 Circuit board display
34 Alarm relay
38 Communication relay
42 Wake/sleep switches
46 Starter
50 Housing
54 Handle
58 Conduit knockout
62 Display and keypad control
66 Terminal
70 USB port

Component

74 Ethernet port
78 Communication connector
82 Transformer/converter
90 Monitoring and control circuitry
94 Current sensor
98 Charge control system
102 Timing components
106 DC output
110 Voltage regulator
114 Eco-float voltage
118 Float voltage
122 Refresh voltage
126 Boost voltage It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

FIG. 1 shows a starting system 2 of one embodiment of the present invention that comprises a battery charger 6 and at least one integrated battery 10. The battery charger may be a SENS MG2 15 A charger manufactured by the applicant (see, https://www.sens-usa.com/product/microgenius-2-family-battery-chargers). The battery charger 6 is configured to receive AC power 14 and/or to pass AC power 18 through a connector 20 (e.g., a 110-240 AC input (4 A) VIA IEC 320 connection) to other interconnected battery units. The charger produces output energy 22 at, for example, 24 V DC at 15 A, through a circuit board 26. The circuit board 26 may be associated with a display 30. The circuit board 26 and/or display 30 may be identical to or similar to that described in the '125 Patent. The circuit board 26 may include alarm 34, communication 38, and wake/sleep functionality 42. In operation, energy 22 used by the battery charger 6 is slightly modified and delivered to a primary battery 10, and sometimes a second battery 10' or batteries. A starter 46, e.g., a starter associated with a fuel-power generator, draws power from the battery when needed.

Figure 2:
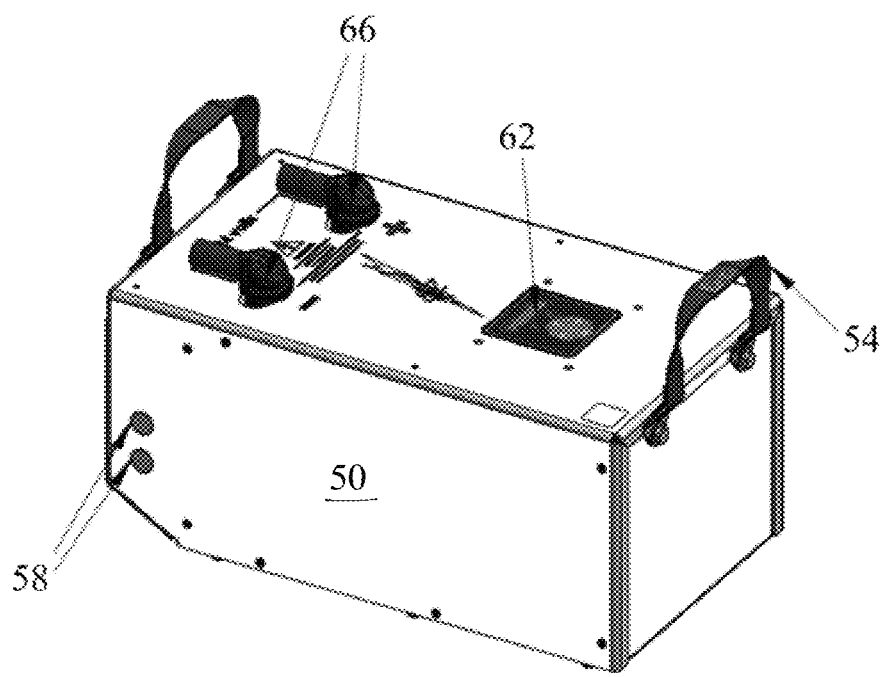
FIG. 2 is a perspective view of the starting system of one embodiment of the present invention.
Figure 3:
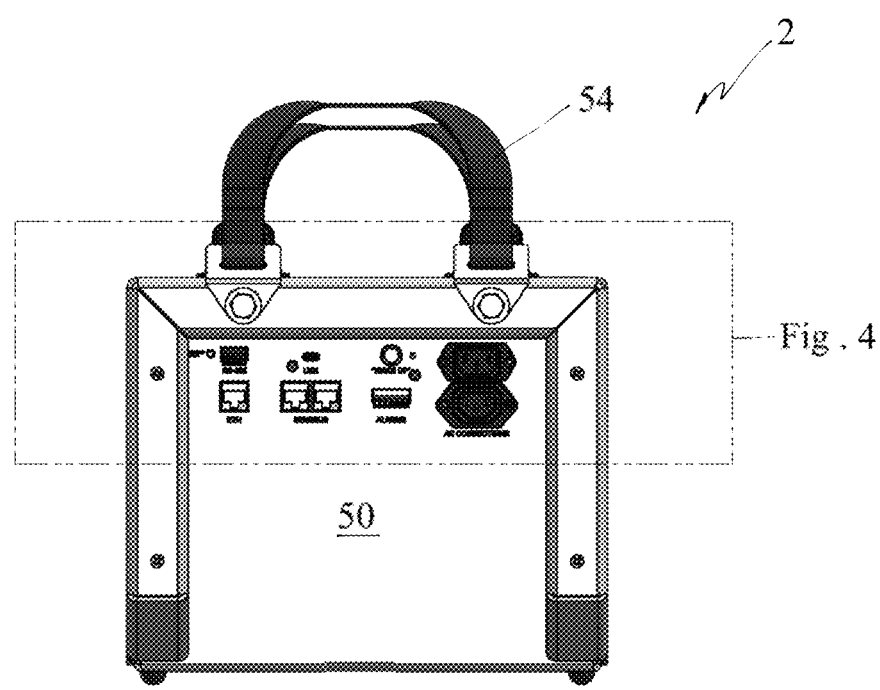
FIG. 3 is a rear elevation view of the starting system shown in FIG. 2.
Figure 4:
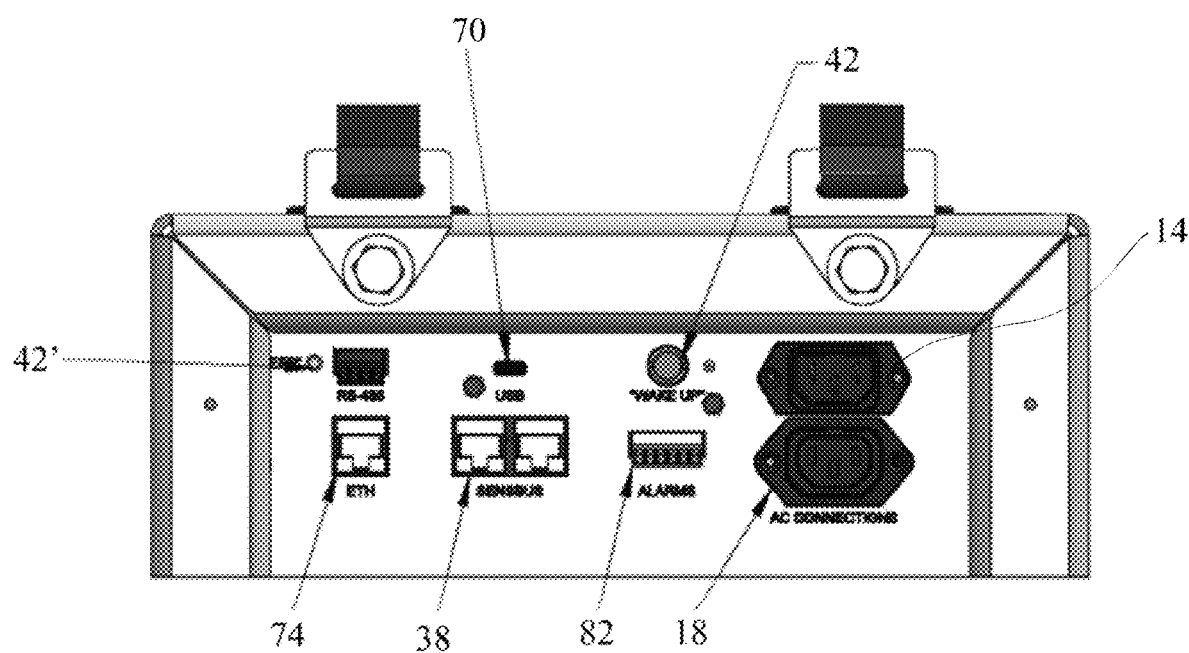
FIG. 4 is a detailed view of FIG. 3.

FIGS. 2-4 show the housing 50 of the starting system 2 of one embodiment of the present invention that is about 20.79 inches long by 11.63 inches wide by about 10.19 inches tall and includes at least one lifting handle 54. The housing 50 may also include a plurality of knockouts 58 designed to accept conduit. The one surface of the housing 50 may include a display and keypad control portion 62, allowing users to assess the status and control the starting system's functions. Connection terminals 66 configured to interconnect corresponding electrical generator connectors are provided. One of ordinary skill in the art will appreciate that the housing 50 may include mounting brackets.

FIGS. 3 and 4 show one surface of the housing 50 that includes a plurality of connection ports. More specifically, embodiments of the present invention include the input AC connector 14 and output AC connector 18 mentioned above. A USB connector 70, ethernet connector 74 (e.g., RS-485 (MODBUS or DN P3)), and communication connector 78 (e.g., Network TCP/IP Modbus DNP3), used to communicate with the starting system to control the same or to update firmware/software, etc., are shown. Communication with the system can be wired or wireless. The aforementioned wake switch 42 and sleep switch 42' are also shown. Finally, an alarm connector (e.g., USB CANBUS) may be employed. One of ordinary skill in the art will appreciate other connectors may be employed without departing the scope of the invention.

Figure 5:
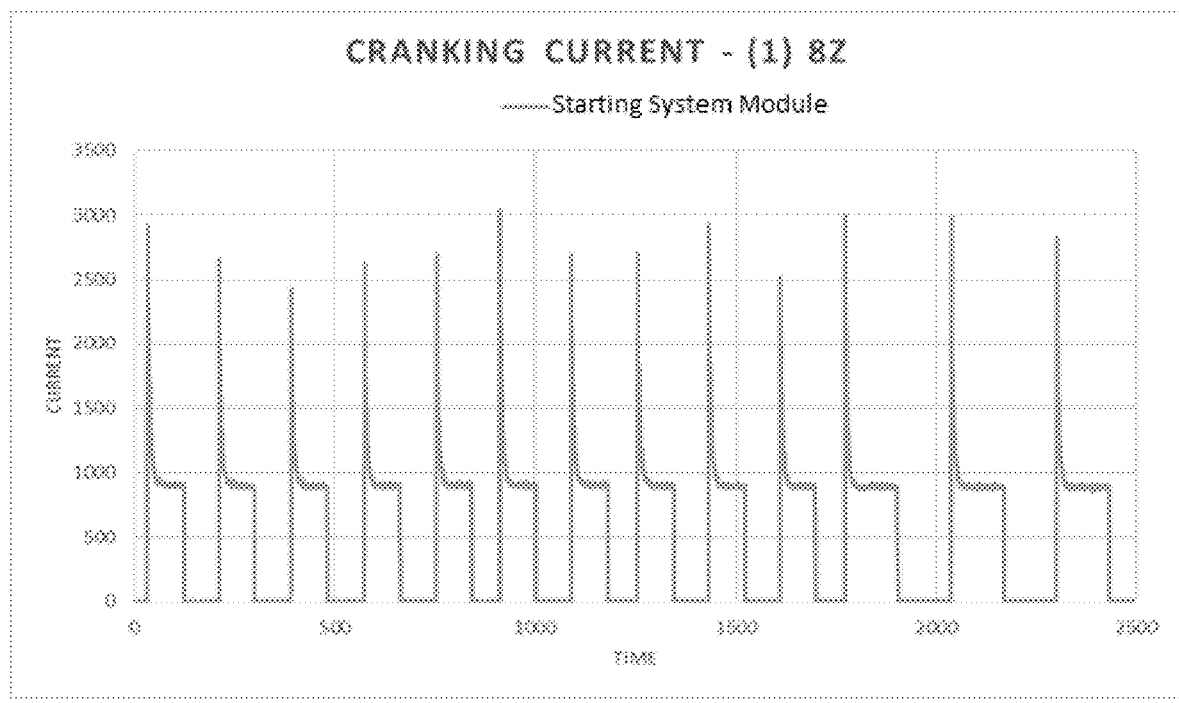
FIG. 5 is a graph showing cranking current produced by the starting system of one embodiment of the present invention.
Figure 6:
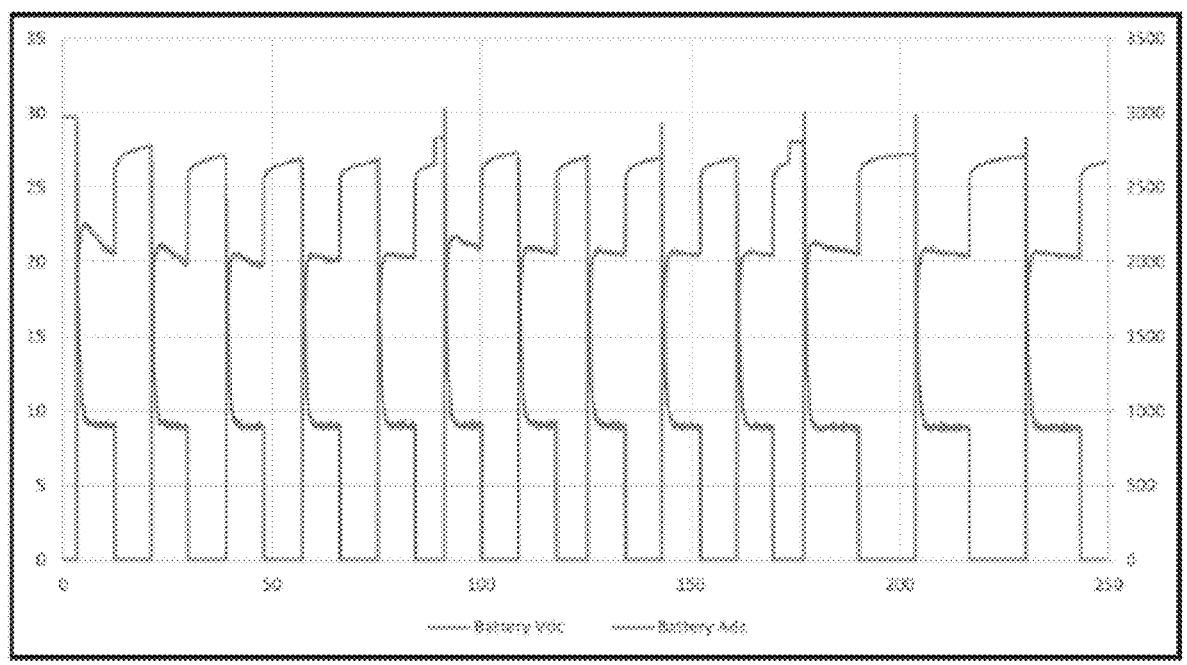
FIG. 6 is a graph similar to that shown in FIG. 5 that also shows battery voltage.

FIGS. 5 and 6 show the results of a performance test, wherein the starting system of one embodiment of the present invention was interconnected to a 2 MW 69 L engine having an oil temperature of about 15.6° C. (60° F.). Here, engine start was initiated, i.e., the engine was cranked, 13 times, comprising ten (10) 10-second cranks and three (3) 15-second cranks with the engine's fuel system disabled to assess how many cranks the starting system would support before complete battery discharge. One of ordinary skill in the art will appreciate that normally, after cranking, the engine will start and the alternator will provide the power needed to charge or recharge the starting system's battery or the engine's battery. Again, the design of this test was to assess the worst-case scenario. Further cranks could be possible, but doing so may have resulted in starter damage. Here, the starting system produced between about 2500 to 3000 A each starting attempt, wherein the current quickly dissipated to about 1000 A, and then, understandably, zeroed before the next crank attempt.

FIG. 6 shows battery current and voltage during the test of FIG. 5. Here, one of ordinary skill in the art will appreciate that when the current spike (about 2500 to 3000 A) of each crank cycle, the battery voltage initially drops then rises to an amount (between 25 and 30 V) as the delivered current diminishes. Again, one or two cranks would have been sufficient in normal operations to start the diesel engine.

Figure 7:
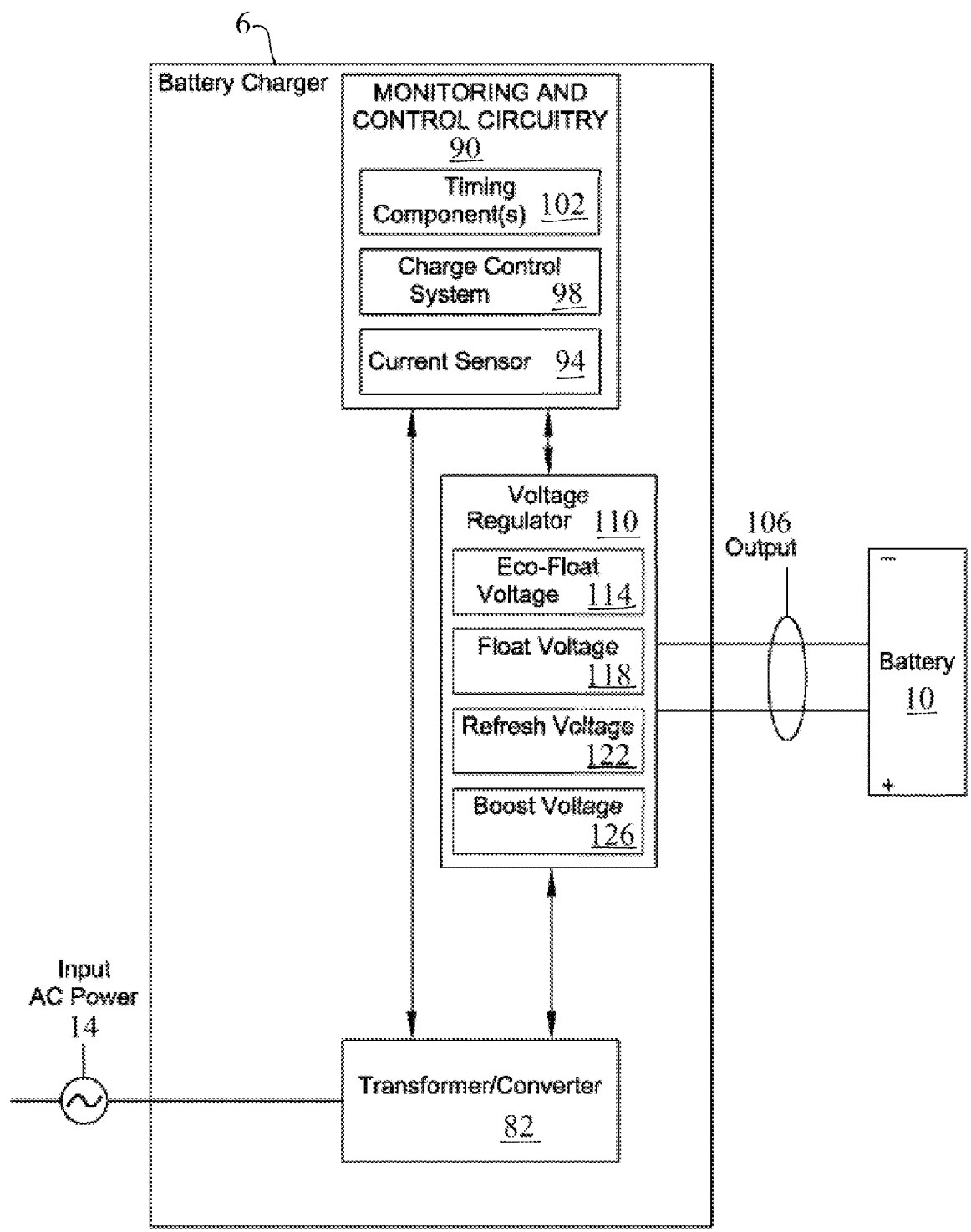
FIG. 7 is a schematic of the battery charger that may be used in the starting system of one embodiment of the present invention.

FIG. 7 is a block diagram of a charger 6 used in the starting system of one embodiment of the present invention. In this embodiment, the charger 6 receives AC input current/power 14 from any appropriate AC power source. AC input current 14 may be converted to DC current/power using a transformer/converter 82 and related circuitry (e.g., switchmode converters). The charger 6 may also include monitoring and control circuitry 90, which may incorporate a current sensor 94, a charge control system 98, and a timing component 102, such as a timer or timers, a clock or clocks, or one or more counters. In this embodiment, the charge control system 98 may include one or more microprocessors, microcontrollers, Application Specific Integrated Circuits (ASICs), and/or the like.

Depending on its state of charge, a battery will accept more or less current from a battery charger that is producing a regulated pre-set DC output voltage. Thus, for a battery charger operating at a set output voltage, a battery will typically draw more current when it is in a discharged state compared to the current it will draw in a fully-charged state at that constant output voltage. Regardless of the battery's state of charge, the battery will typically draw more current when the charger is set to a higher output voltage than when the charger is set to a lower output voltage. With this relationship in mind, the current sensor 94 may be configured to measure a DC output current/power 106 being delivered by the charger 6 to a DC load, which, in this embodiment, may be a NiZn battery 10, another electronic device requiring charging, and/or a DC auxiliary load (e.g., DC-powered auxiliary equipment that draws constant DC power from the battery). The current sensor 94 may provide charge measurements in the form of DC output current/power data (i.e., the current/power drawn or demanded by the battery) to charge control system 98. A timing component 102 may similarly provide time measurements/timing data to the charge control system 98, which may, in turn, use the charge measurements and time measurements transmitted from the current sensor 94 and the timing component 102, respectively, as components of a feedback loop used to regulate the DC output voltage via a voltage regulator 110.

In this regard, the charge control system 98 may employ methods to provide at least four pre-set DC output voltage settings, which regulate the charge delivered to the battery/DC load by regulating the voltage difference between the charger and the battery, thereby impacting the DC output current/power 106 delivered to the battery/DC load. In one embodiment, the four pre-set output voltage settings may include at least one of an eco-float output voltage ($V_{EF}$) 114, a float output voltage ($V_F$) 118, a refresh output voltage ($V_R$) 122, and a boost output voltage ($V_B$) 126. In one embodiment, the float mode is omitted.

Float voltage 118 may be an output voltage sufficient to maintain the battery in its fully charged state by replenishing charge at the same rate the battery self-discharges.

Eco-float output voltage 114 may be an output voltage equal to or nominally higher than an open-circuit voltage of the battery 10. Thus, when the charger 6 operates in an eco-float mode, battery charging voltage is reduced to approximately battery open-circuit voltage. Eco-float output voltage 114 may be maintained for approximately 90-99% of the time that the battery formerly would have been charged on continuous float voltage 118, resulting in long reduced-voltage periods that prolong the battery's life.

Boost output voltage 126 may be a relatively high output voltage that accelerates battery charging either initially or after a discharge event by temporarily increasing the voltage difference between the charger 6 and the battery 10 such that the charger 6 delivers more output current 106 to the battery 10 than the charger 6 would deliver at float output voltage 118.

Refresh output voltage 122 may be higher than float output voltage 118, but lower than or equal to boost output voltage 126. In one embodiment, refresh output voltage 122 may be derived as a function of float output voltage 118 and boost output voltage 126.

While exemplary output voltages have been quantified above, eco-float output voltage ($V_{EF}$) 114, float output voltage ($V_F$) 118, refresh output voltage 106 ($V_R$), and boost output voltage ($V_B$) 126 may be scaled as appropriate for the size of the battery being charged (e.g., 12 volt, 24 volt, 48 volt, 120 volt, 240 volt). In addition, monitoring and the control circuitry 90 may include temperature components that enable the charge control system 98 to provide temperature compensation, which incrementally increases output voltage at lower ambient temperatures and incrementally decreases output voltage at higher ambient temperatures to adequately charge but not overcharge the battery 10. Temperature compensation may apply regardless of the particular set output voltage.

Figure 8:
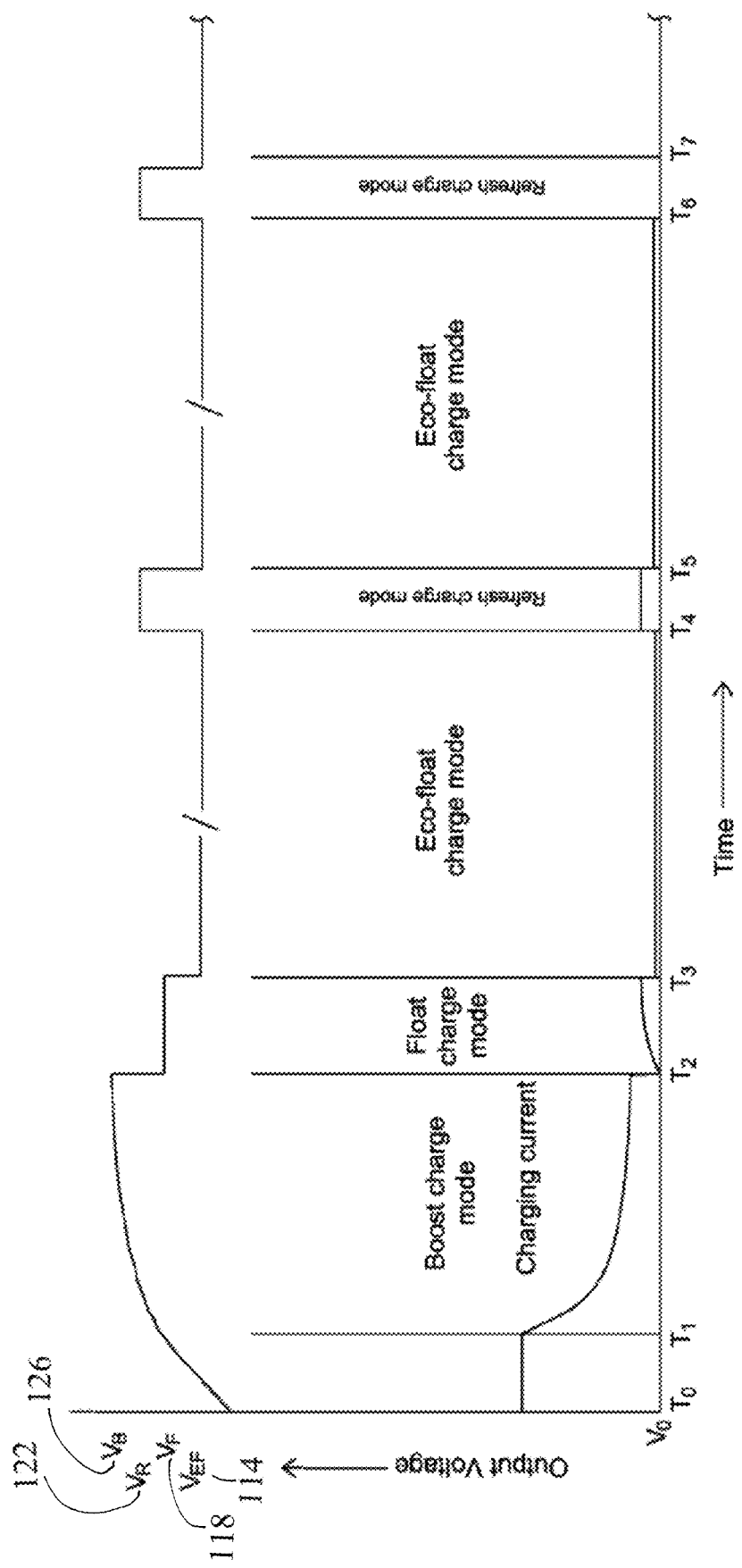
FIG. 8 is a graph depicting a charge mode cycle provided by the charging system of FIG. 7.

FIG. 8 graphically illustrates an exemplary battery-life-extension charging cycle for the battery 10, which has either never been charged or has been completely discharged. In this embodiment, charging begins at T0 when the charger 6 starts operation in a boost charge mode at boost output voltage ($V_B$) 126. The charger 6 may maintain boost output voltage ($V_B$) 126, delivering up to 15.5 volts until the battery 10 is nearly fully charged at T2. Depending on an initial depth of discharge and other field conditions, the time between T0 and T2 may range from a few minutes to more than twenty-four hours.

At T2, charge control system 98 may cause a shift to a float charge mode at float output voltage ($V_F$) 118, based on output current 106 drawn by the battery 10, as measured by current sensor 94. In one embodiment, float charge mode may deliver approximately 13.5 output volts and be maintained for a predefined duration governed by timing components between T2 and T3.

A number of alternatives may be implemented. For example, the charger 6 may start at T0 in a float charge mode at float output voltage ($V_F$) 118 or a refresh charge mode at refresh output voltage 118 ($V_R$). Charger 6 may shift at T2 into eco-float charge mode at eco-float output voltage ($V_{EF}$) 114 or refresh charge mode at refresh output voltage 118 ($V_R$).

In the example of FIG. 8, when the float charge mode ends at T3, the charger 6 may transition to the eco-float charge mode at eco-float output voltage ($V_{EF}$) 114, where it may remain for a programmable time between T3 and T4. In one embodiment, the charger 6 may deliver 12.9 volts in eco-float mode for approximately 96 hours between T3 and T4. If the eco-float charging cycle is interrupted at any point by an AC outage, the charger 6 may either start the overall charging cycle again at T0 or resume operation in the eco-float charge mode at eco-float output voltage ($V_{EF}$) 114. If the eco-float charging cycle is interrupted at any point by a battery discharge event sufficient to cause the charger 6 to deliver a material percentage of its rated output current 106 to the battery 10, the charger 6 may enter the boost charge mode at the boost output voltage ($V_B$) 126 for a period governed by the charge control system 98 and the timing component 102, to quickly recharge the battery 10.

If the eco-float charging cycle is not interrupted, the eco-float time period may expire at T4, after which the charger 6 may transition to the refresh charge mode at refresh output voltage ($V_R$) 122 for a short programmable time between T4 and T5. In one embodiment, the charger 6 may deliver up to 14.2 volts for less than one hour between T4 and T5. If the refresh charge cycle is interrupted by an AC supply outage or a battery discharge event, the charger 6 may either revert to T0 or resume operation in the active charge mode at the time of the outage, depending on the existing charge status of battery 6 after the discharge event (i.e., depending on charging output current 106 delivered to the battery 10). If there is no interruption, the charger 6 may return or revert to eco-float charge mode at T5, where it may remain for approximately 96 additional hours until T6, at which point it may shift to refresh charge mode again for just under one hour. Charger 6 may alternate between timed intervals in the eco-float and refresh charge modes until there is an interruption due to an AC failure or a battery discharge event, in which case, the charger 6 may revert to T0.

In one embodiment, a charge-mode ratio of time in eco-float charge mode to refresh charge mode may be between 90:10 and 99:1, though this ratio may vary based on the frequency of battery discharge events. The ratio of eco-float charge mode to any other voltage charge mode may be adjusted using any numerical multiplier. For example, if an initial ratio of time in eco-float charge mode to refresh charge mode of 99:1 is employed, and later it is found that a ratio of 90:10 offers superior results, the ratio may be adjusted accordingly. Adjusting the ratio of time in one charge mode versus another does not impact the functional aspects of the battery-life-extension systems and methods.

The battery-life-extension charging cycle shown in FIG. 8 reduces battery charging voltage to approximately battery open-circuit voltage (i.e., eco-float output voltage 114) for approximately 90% to 99% of the charging time, which, prevents early and sometimes catastrophic battery failures, and reduces the operating expense associated with maintaining higher output voltages over time.

Figure 9:
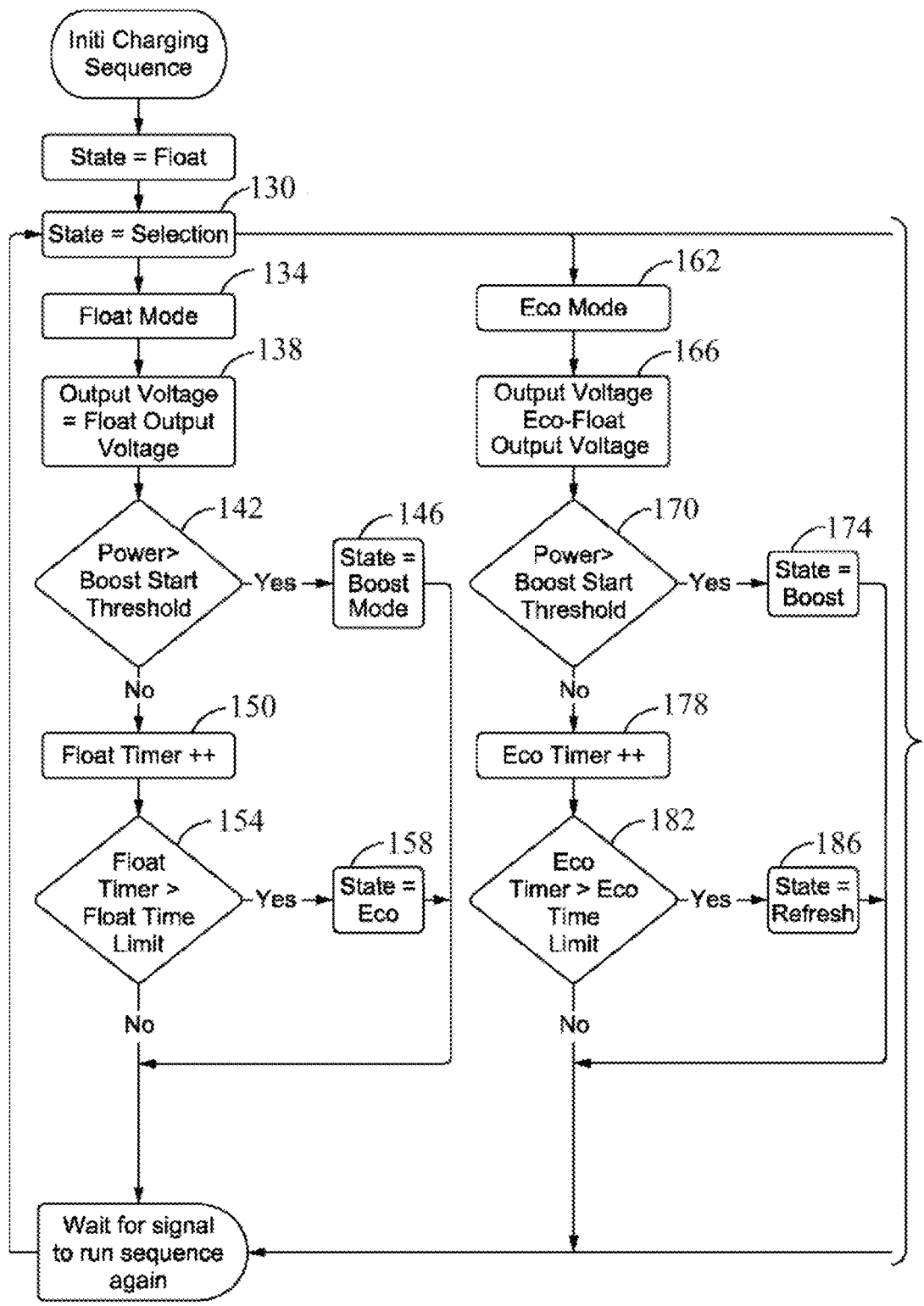
FIG. 9 is a flowchart illustrating a charge method provided by the charging system of one embodiment of the present invention.
Figure 10:
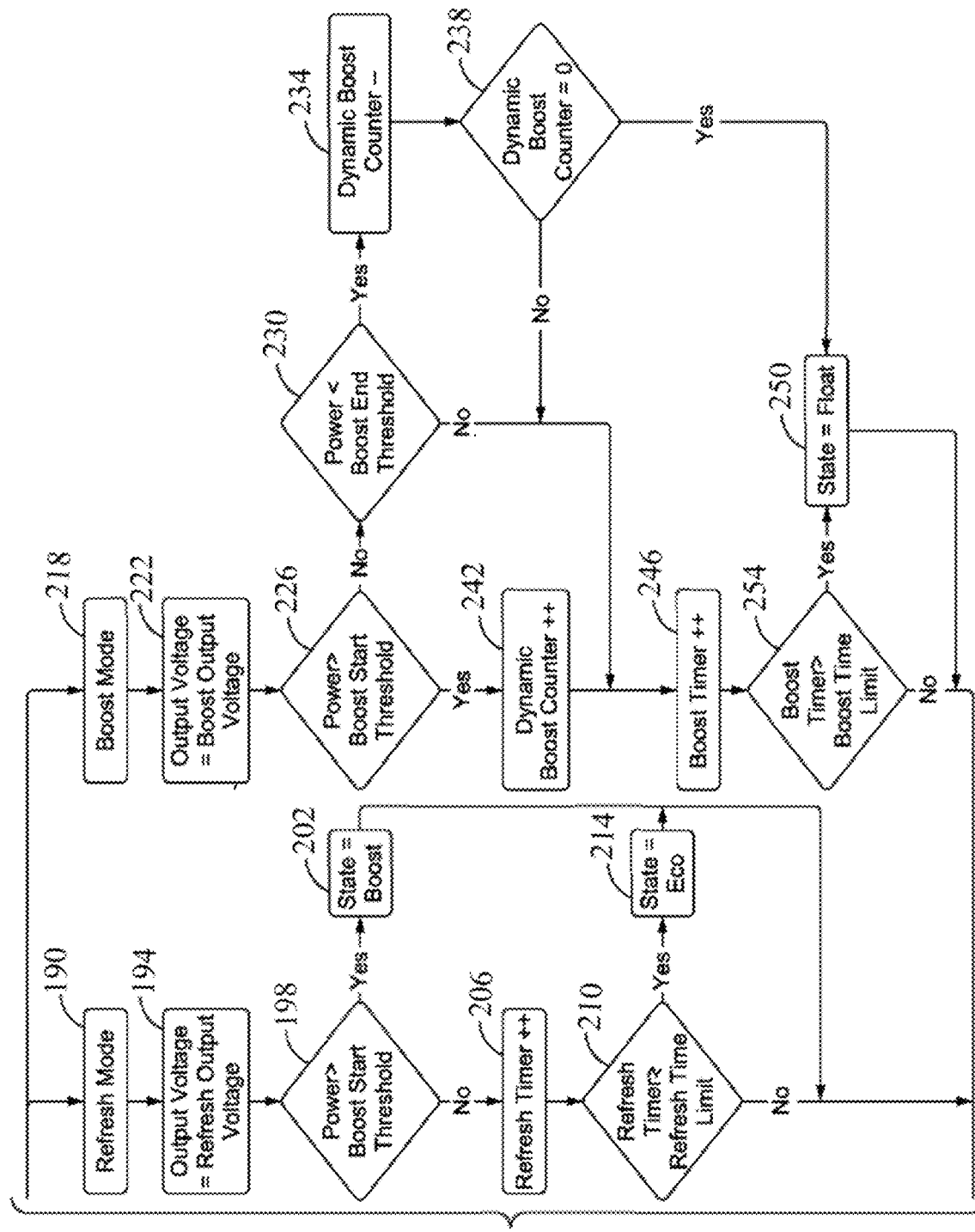
FIG. 10 is a continuation of FIG. 9.

FIGS. 9 and 10 combine to provide a charging-state flowchart that illustrates an exemplary charging method using the charging profile shown in FIG. 7. The method involves four charging modes corresponding to the different the charger output voltages discussed above: float, eco-float, refresh, and boost. To begin, a state selection is made at 130, and the charger is shifted into float mode at 134, when the output voltage is set to float output voltage ($V_F$) 118 at 138. If output current/power 106 drawn/demanded by the battery 10 exceeds a boost-start threshold at 142, the operating state may shift into boost mode at 146, and the next pass through the state flowchart may be via a boost mode path, beginning at 218. If the output current/power demanded by the battery 10 does not exceed the boost-start threshold at 142, the charger 6 may remain in float mode, and the timing component increments at 150. If the timing component increments beyond a pre-programmed time limit for operation in float mode at 154, the charger 6 may shift state into eco mode at 158, and the next pass through the state flowchart may be via an eco mode path, beginning at 162. If the timing component does not increment beyond the pre-programmed time limit for operation in float mode, the charger 6 may remain in float mode, and the next pass through the state flowchart will again be through the float mode path, beginning at 134.

The charger 6 operates in eco mode, beginning at 162, after operating in either float mode beginning at 134 or refresh mode beginning at 190. Shifting from float mode into eco mode is described above in relation to block 158. Once in eco mode, in which the output voltage is set to eco-float output voltage at 166, if the output current/power demanded by the battery 10 exceeds the boost-start threshold at 170, the operating state of the charger 6 may shift into boost mode at 174, and the next pass through the state flowchart may be via the boost mode path, beginning at 218. If output power demanded by the battery does not exceed the boost-start threshold at 170, the charger 6 may remain in eco mode, and timing component increments at 178. If timing component increments beyond a pre-programmed time limit for operation in eco mode at 182, the charger 6 may shift operating state into refresh mode at 186. The next pass through the state flowchart may be through the refresh mode path, beginning at 190. If the timing component does not increment beyond the pre-programmed time limit for operation in eco mode, the charger 6 may remain in eco mode, and the next pass through the state flowchart will again be through the eco mode path, beginning at 162.

The charger operates in refresh mode after the charger has timed out of eco mode. Once in refresh mode, in which output voltage is set to refresh output voltage at 194, if the output current/power demanded by the battery exceeds the boost-start threshold at 198, the operating state of the charger may shift into boost mode at 202, and the next pass through the state flowchart may be via the boost mode path, beginning at 218. If output power demanded by the battery does not exceed the boost-start threshold at 198, the charger may remain in refresh mode, and timing component increments at 206. If timing component increments beyond a pre-programmed time limit for operation in refresh mode at 210, the charger may shift operating state into eco mode at 214, and the next pass through the state flowchart may be through the eco mode path, beginning at 162. If the timing component does not increment beyond the pre-programmed time limit for operation in refresh mode, the charger may remain in refresh mode, and the next pass through the state flowchart will again be through the refresh mode path, beginning at 190.

The charger operates in boost mode after an output power demanded by the battery exceeds the boost-start threshold when the charger is operating in any of the other modes at 142, 170, or 198. Shifting into boost mode, beginning at 218, from any of the other modes is described above. Once in boost mode, in which the output voltage is set to boost output voltage 126 at 222, if the output current/power demanded by the battery exceeds the boost-start threshold at 226, the operating state remains in boost mode. A "dynamic boost counter" of the timing component may increment at 242 to begin computing, for later use, a maximum time value that the charger may remain in boost mode once the output current demanded by the battery drops below the boost-start threshold. Simultaneously, a "boost timer" of the timing component may begin incrementing at 246 to limit the maximum time that the charger may remain in boost mode, regardless of the existing charge status of the battery. If the boost timer exceeds the maximum time for operation in the boost mode or a boost time limit at 254, the operating state may shift to float mode at 250, and the next pass through the state flowchart will be through the float mode path, beginning at 134.

Returning to 226, if the output current/power demanded by the battery is below the boost-start threshold at 226, the charger may remain in boost mode. If the output power demanded by the battery falls below a boost-end threshold to remain in boost mode at 230, the "dynamic boost counter" that began incrementing at 242 may begin to decrement at 234 from the maximum time value it reached after incrementing, as described above. The next pass through the state flowchart will be through the boost mode path, beginning at 218. When the output power demanded by the battery is below the boost-end threshold, and the dynamic boost counter has reached 0, or decremented to a predetermined fraction of the time that the dynamic boost counter had been incrementing, at 238, the operating state may shift into float mode at 250. The next pass through the state flowchart will be through the float mode path, beginning at 134.

While the method is presented in terms of applying all four output voltages, eco-float voltage ($V_{EF}$), float voltage ($V_F$), refresh voltage ($V_R$), and/or boost voltage ($V_B$) in a manner that leverages charge/power measurements and time measurements to ensure a continually fully-charged battery, while at the same time reducing the battery charging voltage to approximately battery open-circuit voltage (i.e., eco-float output voltage 114) for approximately 90% to 99% of the charging time, it should be understood that embodiments of battery-life-extensions methods and system may exclude one or more of the pre-set output voltages. For example, the charger may shift directly from boost charge mode at boost voltage ($V_B$) to eco-float charge mode at eco-float voltage ($V_{EF}$). In another example, boost charge mode may be excluded, such that the battery is recharged after a discharge event in refresh charge mode.

By employing a charging regime that alternates between eco-float output voltage, float output voltage, refresh output voltage, and boost output voltage at precise times and in a manner that maintains the battery in a fully charged state while reducing battery charging voltage to approximately battery open-circuit voltage (i.e., eco-float output voltage) for approximately 90-99% of the time, embodiments of the battery-life-extension charging systems and methods emulate the intermittent type of charging used for batteries installed in vehicles. The disclosed charging regime charges the battery in a manner that meets regulatory requirements mandating the continuous charging of batteries used to start emergency generators and diesel-powered fire pumps, while maintaining an advantageous ratio of charging time at the near open-circuit eco-float battery voltage ($V_{EF}$) to time spent at higher voltages such as float voltage ($V_F$), refresh voltage ($V_R$), and/or boost voltage ($V_B$).

The battery-life-extension function described herein may be implemented on different types of microprocessors and microcontrollers, and with different lines of microcode, and the method may be implemented in battery chargers employing any means to regulate output power, including, but not limited to, thyristor-controlled battery chargers, switch-mode battery chargers, controlled ferro-resonant battery chargers, and battery chargers with variable electro-mechanical power generating means. The method may be employed in battery chargers with or without galvanic isolation and in chargers using AC electrical power, DC electrical power, or mechanical motion as an input power source. The method may be implemented on battery chargers designed to charge batteries (or battery sets, battery strings, or battery stacks) of different sizes.

Figure 11:
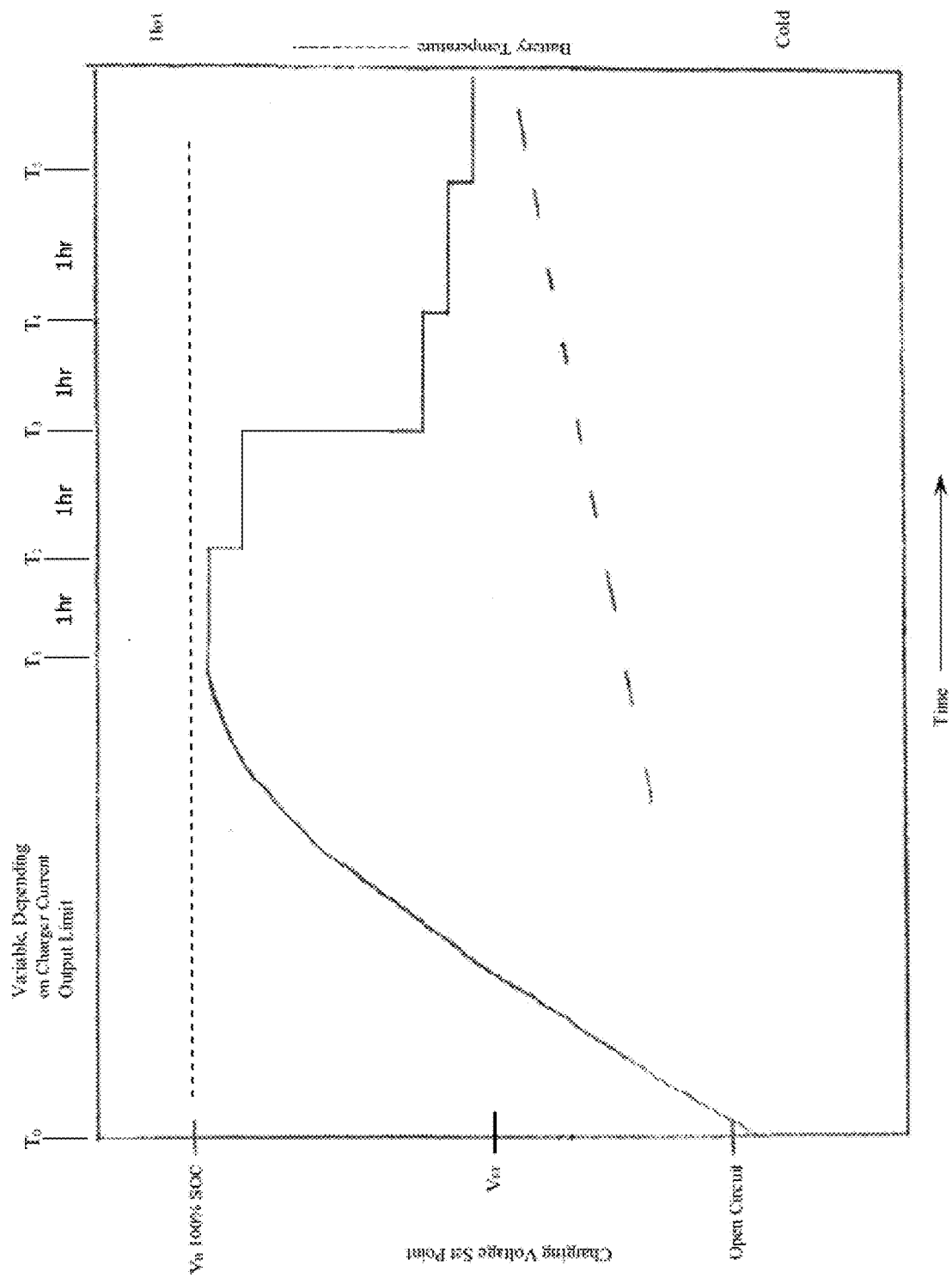
FIG. 11 is a graph depicting boost and float charge modes of provided by the starting system of one embodiment of the present invention.

FIG. 11 shows an approach employed by some embodiments of the present invention configured to maximize charger and battery life by altering how voltage is reduced from the boost voltage ($V_B$) to the eco-float voltage ($V_{EF}$). Here, a modified transition mode is provided wherein charger output voltage is modified as a function of current delivered to the battery and stepped down in predetermined increments at predetermined time intervals. In the example shown in FIG. 11, boost voltage ($V_B$) is variable depending on charger current output limit and is designed to ensure that battery voltage is very near to but does not reach 100% SOC. In one embodiment, however, 100% SOC is approached or briefly reached but not maintained. During the boost mode, the set voltage is not adjusted if the temperature rises above a preset value. The boost voltage ($V_B$) is maintained for a predetermined amount of time, for example, one hour. At T2, the beginning of the transition mode, voltage is reduced in a stepped-down fashion in predetermined amounts and at time increments, e.g., every hour, and not continuously adjusted. In one embodiment, one stepped reduction is greater than subsequent reductions. The system of one embodiment allows time increments to be selectively altered based on battery current or other factors. Following this method will result in a battery temperature rise but not beyond a certain limit to prevent overcharge.

Figure 12:
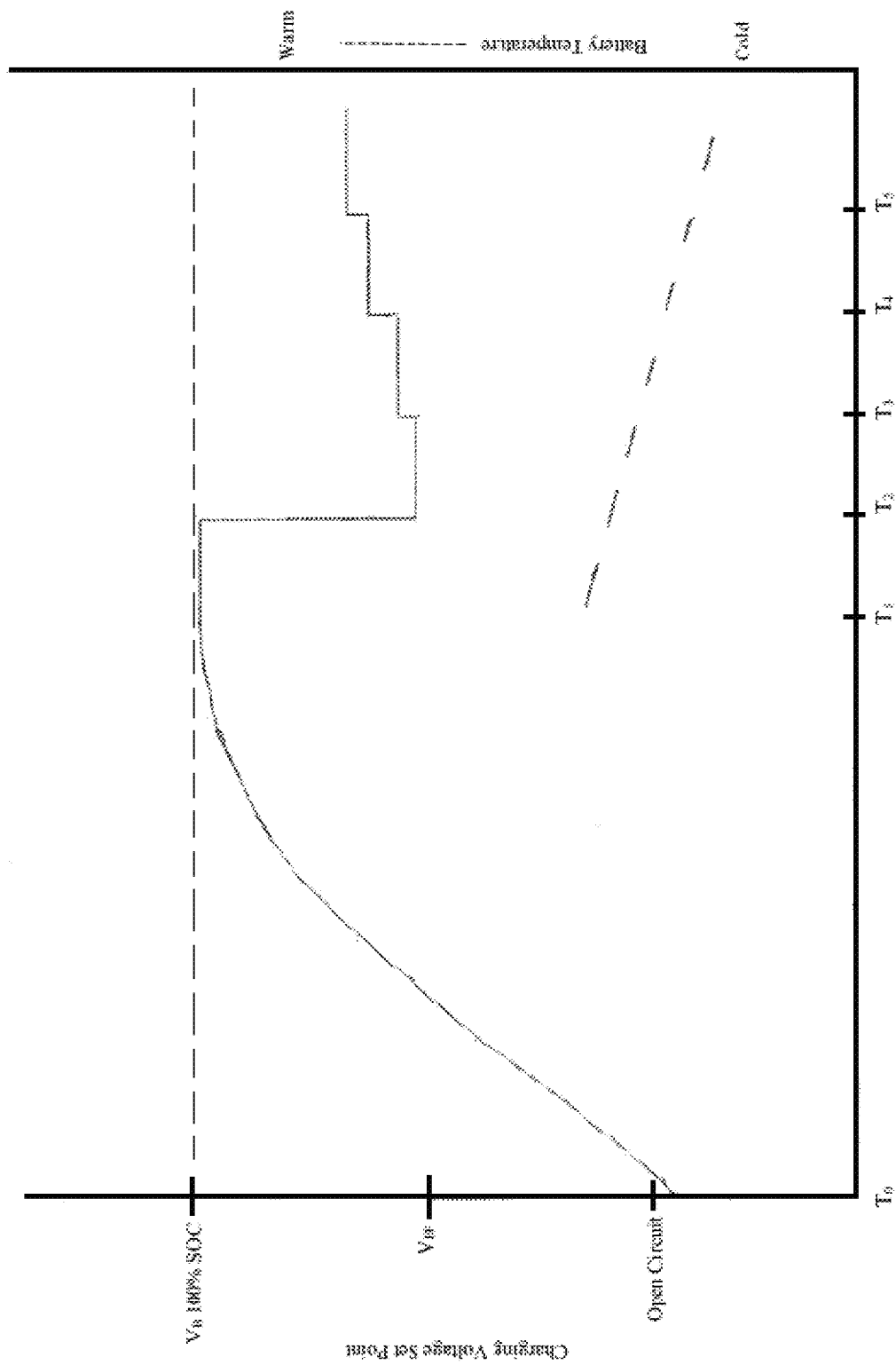
FIG. 12 is a graph depicting a float charge mode provided by the starting system of one embodiment of the present invention.

FIG. 12 shows another battery charging approach employed by some embodiments of the present invention wherein charger voltage is modified as a function of charger output current. In this example, battery temperature is reduced by initially dropping charger output current during the transition mode to a point lower than the eco-float voltage ($V_{EF}$). Thereafter, charger output voltage is incrementally stepped-up at predetermined time intervals. Again, each time increment may be selectively altered based on battery temperature/current or other factors. Ultimately, a voltage set point will be that of the eco-float voltage ($V_{EF}$), and the battery temperature be held below an acceptable level.

One of ordinary skill in the art will appreciate that transition from boost voltage ($V_B$) to eco-float voltage ($V_{EF}$) may be a constant (e.g., linear) decrease/increase, or something similar that is not stepped. In addition, the eco-float mode can be omitted, wherein no current is delivered to the battery after the boost and modified float charge modes. Regardless of the modified float charge mode profile—stepped-up or stepped-down—a refresh charge mode may be required from time to time to maintain acceptable battery charge characteristics. Further, in times between boost charge mode/float charge mode and any required refresh charge modes, little or no current should be delivered to the battery or batteries.

Embodiments of battery-life-extension charging method may be implemented using a circuit comprised of standard logic elements instead of a processor-executed algorithm or computer program. Charging method implementations may also involve an integrated circuit implementation of the standard logic elements, such as a field-programmable gate array (FPGA).

Embodiments of battery-life-extension charging method may also be implemented using mechanical mechanisms, such as a clockwork timer, tally counter (similar to an automotive odometer), and a mechanical calculating device (similar to those used in adding machines), etc. Electromechanical means may also be employed (e.g., a stepping relay, an electro-mechanical tally counter).

The terms "microprocessor," "microcontroller," and "digital signal processing" are intended to be as general as possible, referring to an electronic component that has digital (and usually also analog) inputs and outputs. A microcontroller or DSP can be implemented using one or more electronic device connected together and interconnected with other control circuitry inside of the battery charger.

The terms "timer" and "counter" are likewise intended to be as general as possible. The battery charger's timing functions can be implemented in the microcontroller and therefore there's no need for a separate piece of hardware that is a timer or that functions only as a timer.

The terms "charger" and "battery charger" are intended to be descriptive of an electronic finished product that is housed in an enclosure and has electrical input, output, and user controls. Such battery chargers accept either sinusoidal AC input power or DC input power, and provide rectified and regulated DC output power which may be filtered or unfiltered.

Thus, although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

Exemplary characteristics of embodiments of the present invention have been described. However, to avoid unnecessarily obscuring embodiments of the present invention, the preceding description may omit several known apparatus, methods, systems, structures, and/or devices one of ordinary skill in the art would understand are commonly included with the embodiments of the present invention. Such omissions are not to be construed as a limitation of the scope of the claimed invention. Specific details are set forth to provide an understanding of some embodiments of the present invention. It should, however, be appreciated that embodiments of the present invention may be practiced in a variety of ways beyond the specific detail set forth herein.

Modifications and alterations of the various embodiments of the present invention described herein will occur to those skilled in the art. It is to be expressly understood that such modifications and alterations are within the scope and spirit of the present invention, as set forth in the following claims. Further, it is to be understood that the invention(s) described herein is not limited in its application to the details of construction and the arrangement of components set forth in the preceding description or illustrated in the drawings. That is, the embodiments of the invention described herein are capable of being practiced or of being carried out in various ways. The scope of the various embodiments described herein is indicated by the following claims rather than by the foregoing description. And all changes which come within the meaning and range of equivalency of the claims are to be embraced within their scope. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The foregoing disclosure is not intended to limit the invention to the form or forms disclosed herein. In the foregoing Detailed Description, for example, various features of the invention are grouped together in one or more embodiments for the purpose of streamlining the disclosure. This method of disclosure is not to be interpreted as reflecting an intention that the claimed inventions require more features than expressly recited. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention. Further, the embodiments of the present invention described herein include components, methods, processes, systems, and/or apparatus substantially as depicted and described herein, including various sub-combinations and subsets thereof. Accordingly, one of skill in the art will appreciate that would be possible to provide for some features of the embodiments of the present invention without providing others. Stated differently, any one or more of the aspects, features, elements, means, or embodiments as disclosed herein may be combined with any one or more other aspects, features, elements, means, or embodiments as disclosed herein.

What is claimed is:

1. A battery charging system configured to selectively transfer current from a charger to at least one interconnected battery, comprising:
    a monitoring component configured to measure:
        an existing charge status of the at least one interconnected battery,
        a direct current (DC) output current delivered by the charger to at least one interconnected battery, wherein the DC output current is a function of the existing charge status of the at least one interconnected battery, and
        a temperature of the at least one interconnected battery;
    a control system in communication with the monitoring component and a timing component, the control system configured to initiate charging of the at least one interconnected battery based on a first temperature of the at least one interconnected battery, wherein the control system obtains a time measurement from the timing component and/or a charge measurement from the monitoring component;
    wherein based on the time measurement and/or the charge measurement, defining at least one of a time to complete a charge mode cycle and a charge required to complete a charge mode cycle that are tailored to achieve a desired charge status of the at least one interconnected battery;
    based on at least one of a determined time and a determined charge to complete the charge mode cycle, transitioning to a select one of a number of DC output voltage settings until the determined time to complete a determined charge mode cycle has passed or the charge to complete the charge mode cycle has been provided, wherein the DC output voltage settings include a boost output voltage setting, a float output voltage setting, and an eco-float output voltage setting;
    wherein the eco-float output voltage setting is associated with a voltage less than the float output voltage setting and nominally higher than an open-circuit voltage of the at least one interconnected battery, with a near zero charge current provided to the at least one interconnected battery to maintain the at least one interconnected battery at a partial charge state, while allowing the at least one interconnected battery to support an external load;
    wherein the float output voltage setting comprises a transition from the boost output voltage setting to the eco-float output voltage setting in a series of incremental voltage changes; and
    wherein the charger will cease delivering current to the at least one interconnected battery if the at least one interconnected battery reaches a second temperature that is greater than the first temperature.

2. The battery charging system of claim 1, wherein each of the incremental voltage changes occur after a change in temperature occurs.

3. The battery charging system of claim 1, wherein the at least one interconnected battery is never maintained at 100% capacity.

4. The battery charging system of claim 1, wherein the second temperature of the at least one interconnected battery is less than about 40 degrees C. (about 104 degrees F.).

5. The battery charging system of claim 1, wherein the control system is further configured for continually repeating the obtaining the at least one of a time measurement and a charge measurement, determining at least one of a time to complete a charge mode cycle and a charge to complete the charge mode cycle, and the transitioning to a select one of a number of the DC output voltage settings.

6. The battery charging system of claim 1, wherein:
    the boost output voltage setting comprises a boost output voltage that is equal to a maximum voltage required to accelerate charging of the at least one interconnected battery; and
    wherein the DC output voltage settings additionally include a refresh output voltage setting that provides a voltage higher than the eco-float output voltage setting and equal to or less than the boost output voltage setting.

7. The battery charging system of claim 1, wherein:
    the monitoring component comprises a DC current sensor integrated within a monitoring and control circuitry of the charging system; and
    the timing component is one or more of a timer, a clock, or a counter integrated within the monitoring and control circuitry of the charging system.

8. The battery charging system of claim 1, further comprising a temperature sensor interconnected directly to the at least one interconnected battery configured to communicate with the monitoring component.

9. The battery charging system of claim 1, wherein the at least one interconnected battery comprises a plurality of batteries that are interconnected in series and/or parallel, and wherein the control system is configured to assess voltage, temperature, and impedance of each battery.

10. The battery charging system of claim 9, wherein the control system employs a battery charging algorithm that directs the charger to set a temperature-adjusted charge voltage based on the voltage, temperature, or impedance of each battery.

11. The battery charging system of claim 9, wherein the control system employs a battery charging algorithm that directs the charger to set a temperature-adjusted charge voltage based on a maximum temperature of the at least one interconnected battery.

12. The battery charging system of claim 9, wherein the control system employs a battery charging algorithm that directs the charger to set a temperature-adjusted charge voltage based on an average temperature of the at least one interconnected battery.

13. The battery charging system of claim 9, wherein the charger comprises a plurality of chargers, wherein the control system of one charger is a master control system that synchronizes charging operations of all interconnected chargers, the master control system employing a battery charging algorithm that directs battery charging based on an average battery temperature.

14. The battery charging system of claim 9, wherein the charger comprises a plurality of chargers, wherein the control system of one charger is a master control system that synchronizes charging operations of all interconnected chargers, the master control system employing a battery charging algorithm that directs battery charging based on the temperature of the warmest or the coolest battery.

15. The battery charging system of claim 1, wherein the series of incremental voltage changes comprise at least one voltage reduction.

16. The battery charging system of claim 15, wherein the at least one voltage reduction is a series of incremental voltage reductions, wherein one voltage reduction is greater than subsequent voltage reductions.

17. The battery charging system of claim 15, further comprising a series of incremental voltage increases that increase voltage of the at least one interconnected battery to a level above the eco-float output voltage setting but below the boost output voltage setting.

18. A method of charging a battery comprising:
obtaining a charge measurement associated with a battery via a monitoring component of a battery charger, the charge measurement reflecting a direct current DC output current delivered by the battery charger to the battery;
obtaining a time measurement associated with the battery via a timing component of the battery charger;
obtaining a battery temperature measurement;
transmitting at least one of the charge measurement, the time measurement, and the battery temperature measurement to a battery charge control system of the battery charger;
initiating battery charge, wherein the battery charge control system directs the battery charger to direct current to the battery;
determining, by the battery charge control system and based on at least one of the charge measurement, the time measurement, and the battery temperature measurement, a charge to complete a charge mode cycle and/or a time to complete the charge mode cycle, the charge mode cycle being tailored to achieve a desired charge status of the battery;
selectively regulating, by a voltage regulator in communication with the battery charge control system, a DC output voltage of the battery charger to one of a number of pre-set DC output voltages until the time to complete the charge mode cycle has passed or the charge to complete the charge mode cycle has been provided, the pre-set DC output voltages comprising a boost output voltage setting, a float voltage output setting, and an eco-float output voltage setting;
wherein the eco-float output voltage setting is associated with a voltage less than the float voltage output setting and nominally higher than an open-circuit voltage of the battery, with a near zero charge current provided to the battery to maintain the battery at a partial charge state, while allowing the battery to support an external load; and
wherein the float output voltage setting comprises a transition from the boost output voltage setting to the eco-float output voltage setting in a series of incremental voltage changes; and
ceasing battery charging if the battery temperature measurement indicates a battery temperature above a predetermined maximum temperature.

19. The method of charging of claim 18, wherein obtaining a temperature measurement comprises providing a temperature sensor interconnected directly to the battery configured to communicate with the battery charge control system.

20. The method of charging of claim 18, wherein the battery is a first battery, and further comprising a second battery interconnected to the first battery in series or parallel, and wherein the battery charge control system is configured to assess at least one of voltage, temperature, and impedance of each battery.

21. The method of charging of claim 18, wherein the battery charge control system employs a battery charging algorithm that directs the battery charger to set a temperature-adjusted charge voltage based on a maximum temperature of the battery.

22. The method of charging of claim 18, wherein the battery charge control system employs a battery charging algorithm that directs the battery charger to set a temperature-adjusted charge voltage based on an average temperature of the battery.

* * * * *